(12) United States Patent
Ninh

(10) Patent No.: US 12,533,120 B2
(45) Date of Patent: Jan. 27, 2026

(54) LUGGAGE TAG SUTURE ASSEMBLIES AND RELATED SURGICAL TECHNIQUES

(71) Applicant: Orthotek, LLC, Los Alamitos, CA (US)

(72) Inventor: Christopher Ninh, Irvine, CA (US)

(*) Notice: Subject to any disclaimer, the term of this patent is extended or adjusted under 35 U.S.C. 154(b) by 71 days.

(21) Appl. No.: 18/671,781

(22) Filed: May 22, 2024

(65) Prior Publication Data

US 2024/0407776 A1    Dec. 12, 2024

Related U.S. Application Data

(63) Continuation-in-part of application No. 17/736,006, filed on May 3, 2022, now Pat. No. 12,016,549, which is a continuation of application No. 17/553,646, filed on Dec. 16, 2021, now Pat. No. 11,350,926.

(51) Int. Cl.
*A61B 17/04* (2006.01)

(52) U.S. Cl.
CPC ...... *A61B 17/0401* (2013.01); *A61B 17/0485* (2013.01); *A61B 2017/0412* (2013.01); *A61B 2017/0414* (2013.01); *A61B 2017/044* (2013.01)

(58) Field of Classification Search
CPC ............ A61B 17/0401; A61B 17/0485; A61B 2017/0412; A61B 2017/0414; A61B 2017/044; A61B 17/06166; A61B 5/6837
See application file for complete search history.

(56) References Cited

U.S. PATENT DOCUMENTS

| | | | |
|---|---|---|---|
| 7,329,272 B2 | 2/2008 | Burkhart |
| 7,892,256 B2 | 2/2011 | Grafton et al. |
| 8,118,836 B2 | 2/2012 | Denham et al. |
| 8,545,535 B2 | 10/2013 | Hirotsuka et al. |
| 8,652,172 B2 | 2/2014 | Denham et al. |
| 8,882,801 B2 | 11/2014 | DiMatteo et al. |
| 8,961,560 B2 | 2/2015 | Avelar et al. |
| 9,060,764 B2 | 6/2015 | Sengun |
| 9,161,748 B2 | 10/2015 | West, Jr. |
| 9,284,668 B2 | 3/2016 | Johnson |
| 9,295,460 B2 | 3/2016 | Hoof et al. |
| 9,421,007 B2 | 8/2016 | Brady et al. |
| 9,597,068 B2 | 3/2017 | Sengun |
| 9,610,077 B2 | 4/2017 | Allen |
| 9,615,821 B2 | 4/2017 | Sullivan |
| 9,737,293 B2 | 8/2017 | Sengun et al. |

(Continued)

*Primary Examiner* — Phong Son H Dang
(74) *Attorney, Agent, or Firm* — Roland J. Tong

(57) ABSTRACT

Methods of repairing tissue include obtaining a suture including a first end defining an opening and a second end capable of passing through the opening; passing the first end through the tissue at a first location; passing the second end through the tissue at a second location; forming a luggage tag configuration by passing the second end through the first end; and securing the luggage tag configuration against the tissue. In some examples, the suture is a continuous closed loop, and in others the suture has a barbell configuration, with a linear central portion and a loop at each end. In still examples, the suture has a loop at one end and a tail at the other. The suture may be used without an anchor or may be part of a suture assembly including a suture anchor and, optionally, at least one other suture.

3 Claims, 32 Drawing Sheets

(56) References Cited

U.S. PATENT DOCUMENTS

| | | | |
|---|---|---|---|
| 10,034,663 B1 | 7/2018 | Nason et al. | |
| 10,092,285 B2 | 10/2018 | Graul et al. | |
| 10,245,019 B2 | 4/2019 | Sengun | |
| 10,327,755 B2 | 6/2019 | Feezor et al. | |
| 10,335,136 B2* | 7/2019 | Dooney, Jr. | A61B 17/06166 |
| 10,595,853 B2 | 3/2020 | Feezor et al. | |
| 10,631,848 B2 | 4/2020 | Sengun et al. | |
| 11,224,417 B2 | 1/2022 | Nason et al. | |
| 2006/0282081 A1 | 12/2006 | Fanton et al. | |
| 2007/0219558 A1 | 9/2007 | Deutsch | |
| 2008/0208252 A1 | 8/2008 | Holmes | |
| 2008/0312689 A1* | 12/2008 | Denham | D04C 1/06 606/228 |
| 2010/0160962 A1 | 6/2010 | Dreyfuss et al. | |
| 2012/0158051 A1 | 6/2012 | Foerster | |
| 2014/0013931 A1* | 1/2014 | Dow | D04C 3/24 87/11 |
| 2015/0164497 A1 | 6/2015 | Callison et al. | |
| 2016/0174961 A1* | 6/2016 | Callison | A61B 17/0401 606/228 |
| 2019/0125340 A1* | 5/2019 | Bettenga | A61B 17/06166 |
| 2019/0343507 A1 | 11/2019 | Chavan et al. | |
| 2020/0022701 A1 | 1/2020 | Crook et al. | |
| 2022/0142635 A1* | 5/2022 | Bachmaier | A61B 17/8061 |

\* cited by examiner

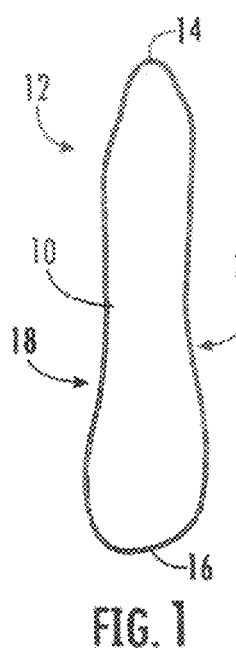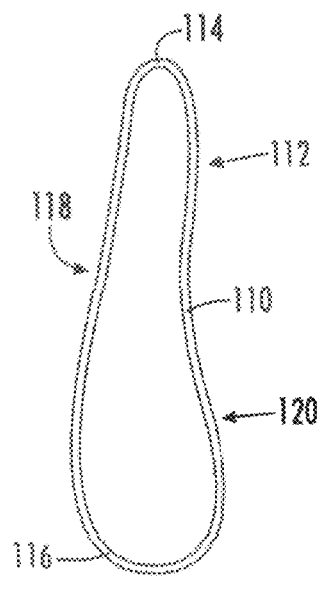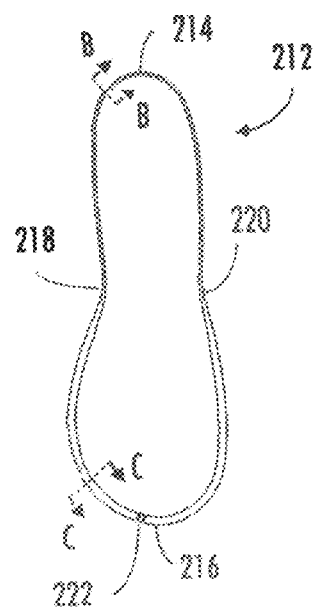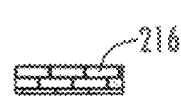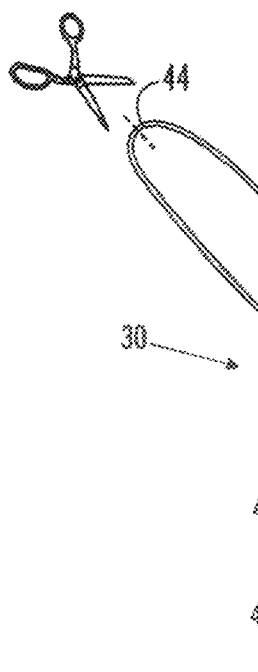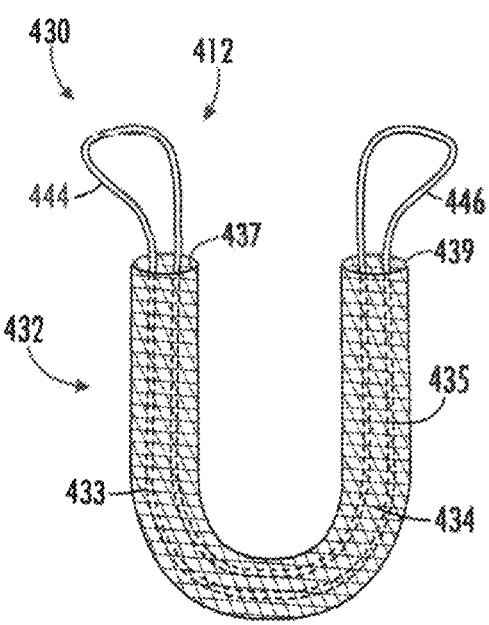

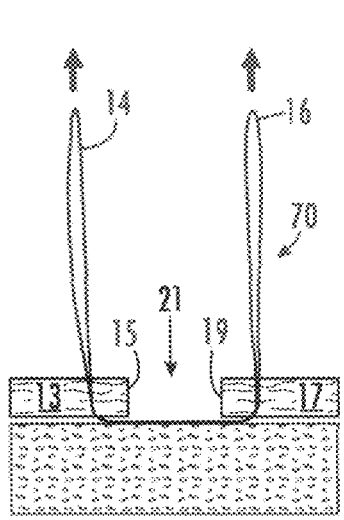 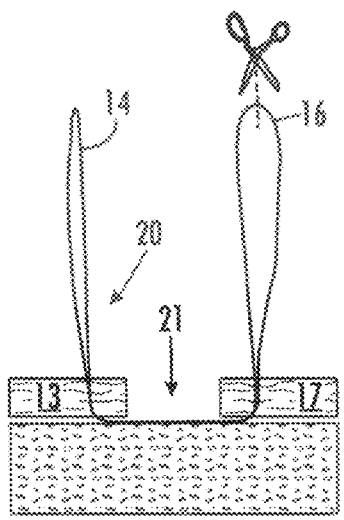 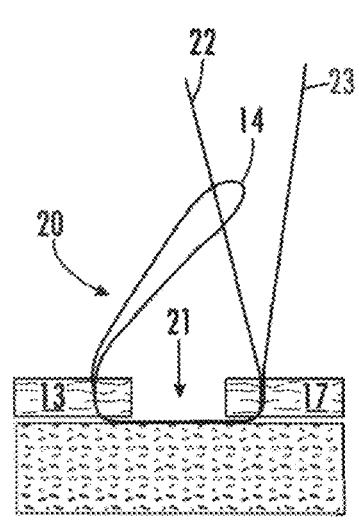
FIG. 5A  FIG. 5B  FIG. 5C
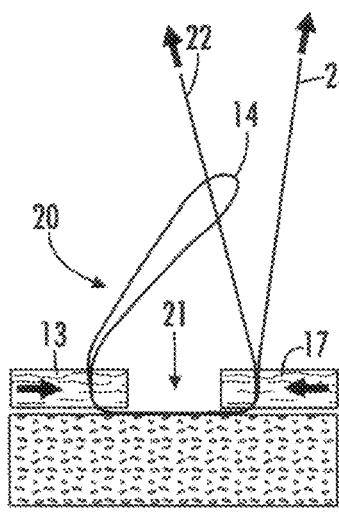 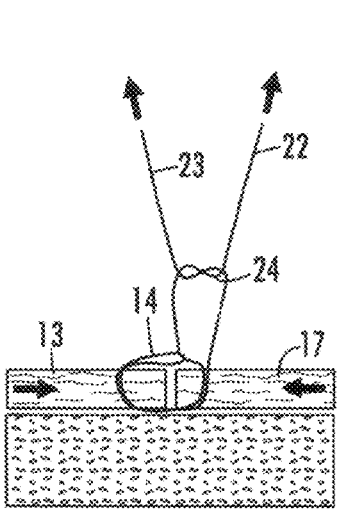 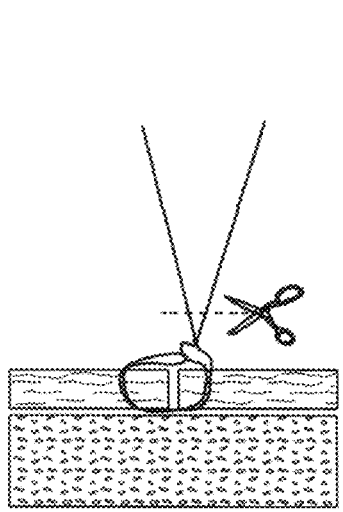
FIG. 5D  FIG. 5E  FIG. 5F

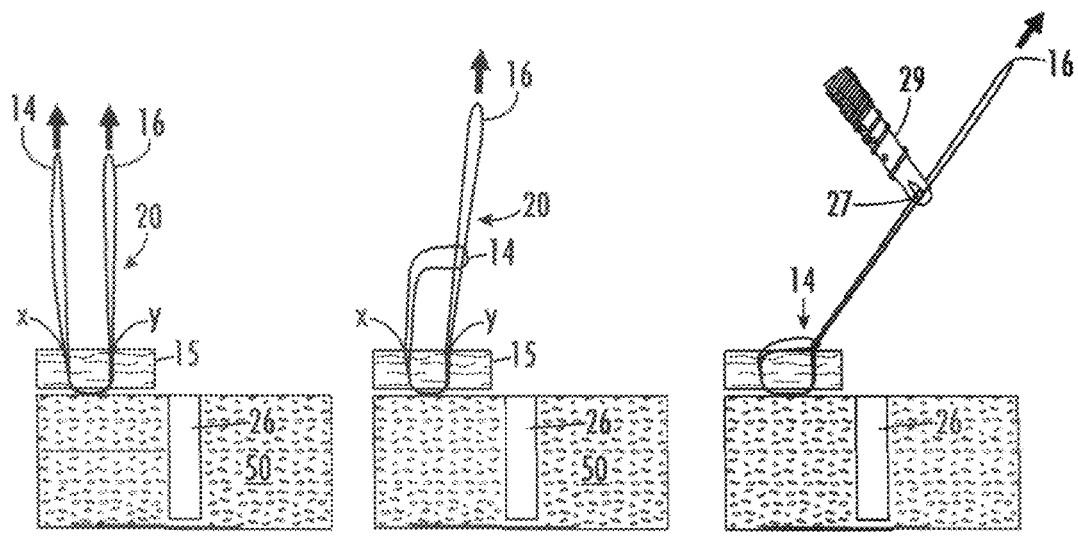
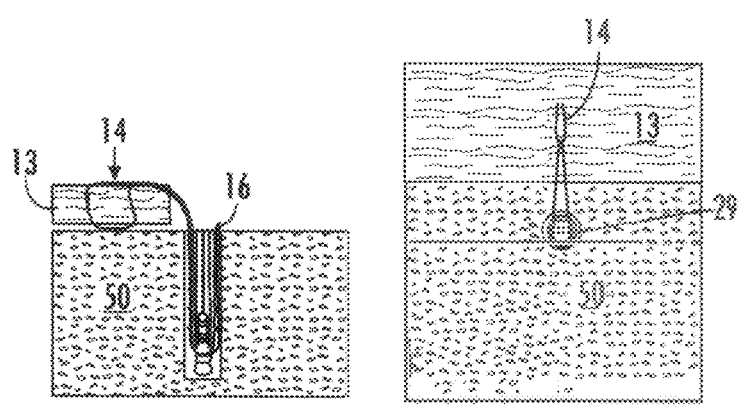

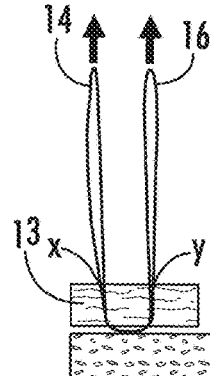
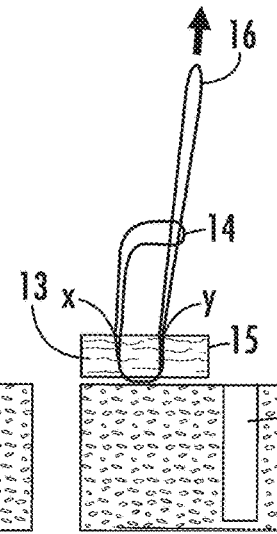
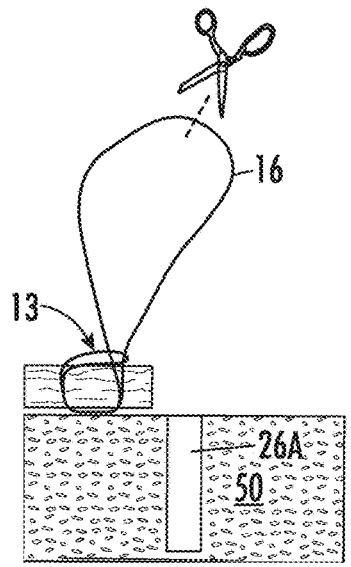
FIG. 9A  FIG. 9B  FIG. 9C
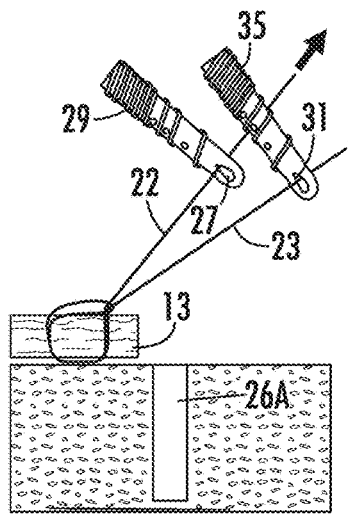
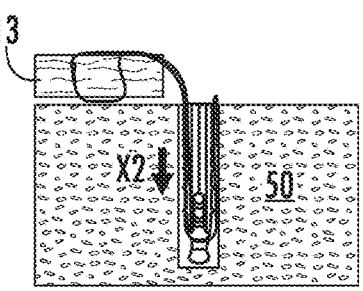
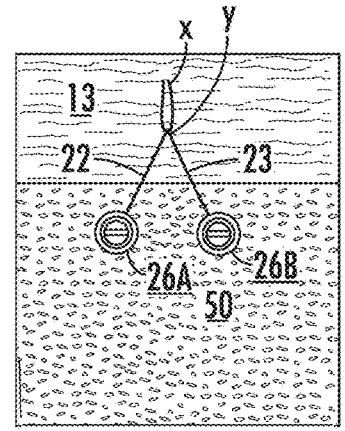
FIG. 9D  FIG. 9E  FIG. 9F

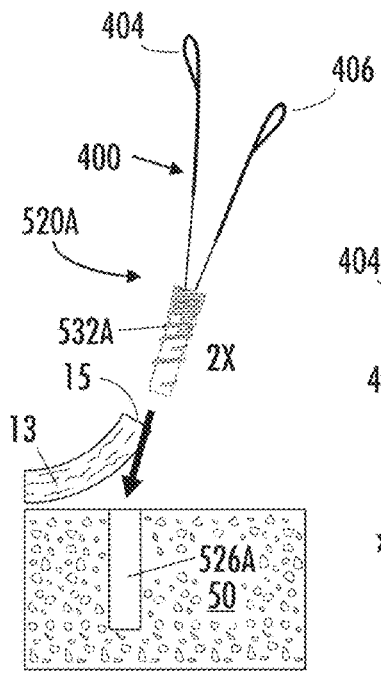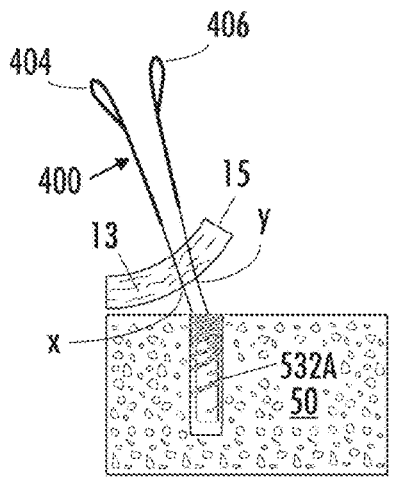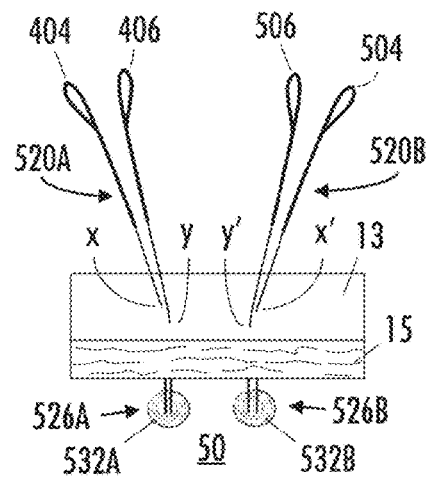
FIG. 25A  FIG. 25B  FIG. 25C
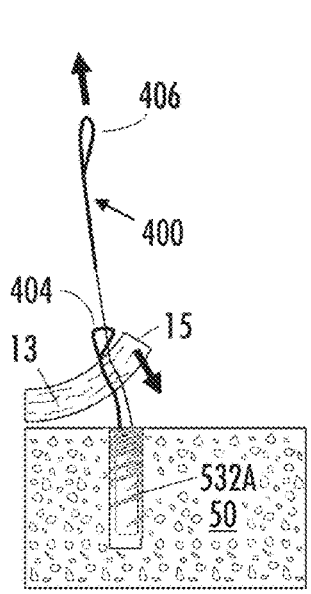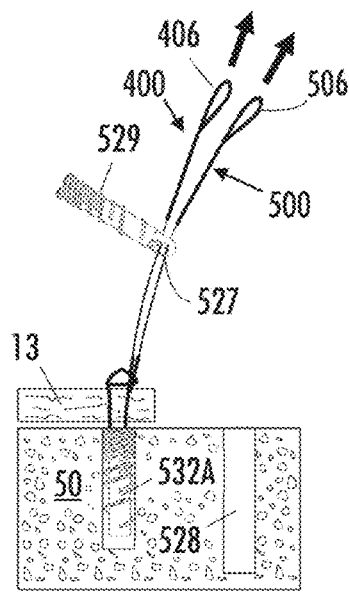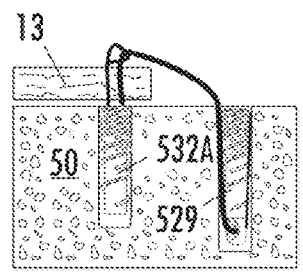
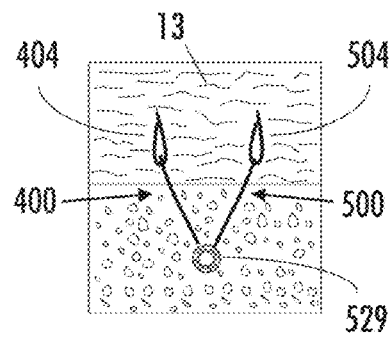
FIG. 25D  FIG. 25E  FIG. 25F  FIG. 25G

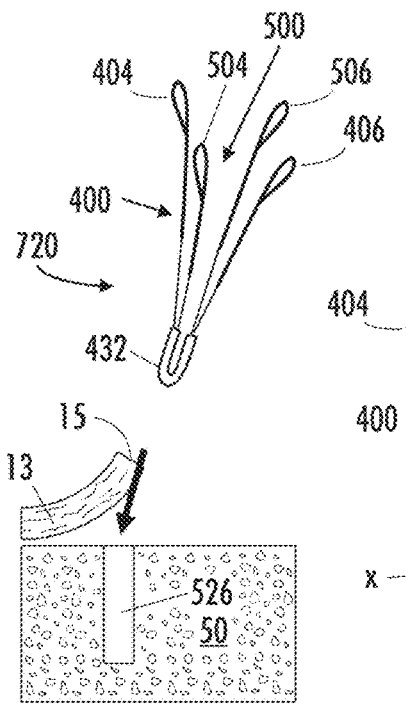
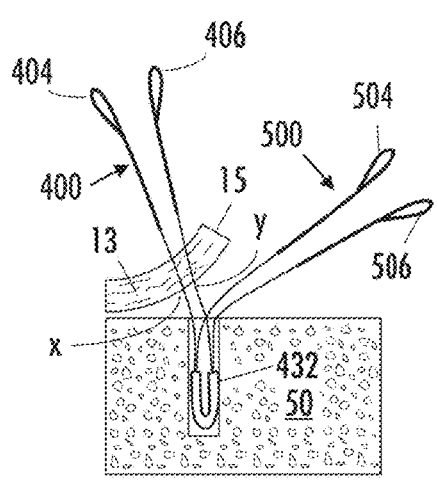
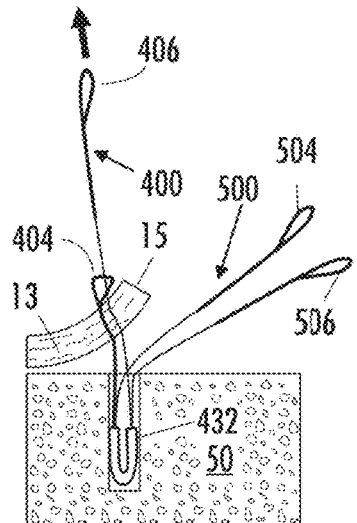
FIG. 26A  FIG. 26B  FIG. 26C
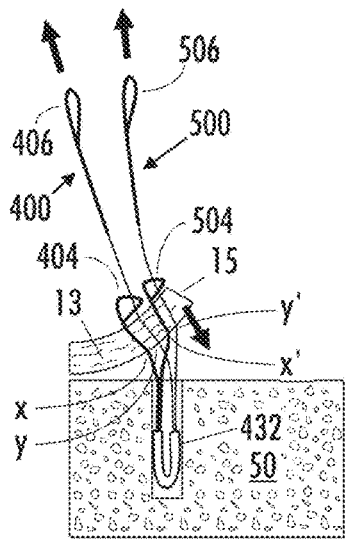
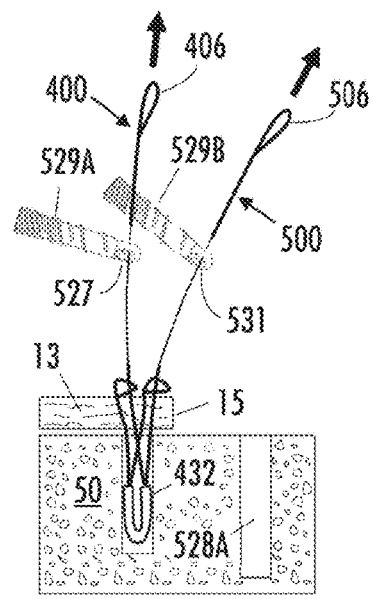
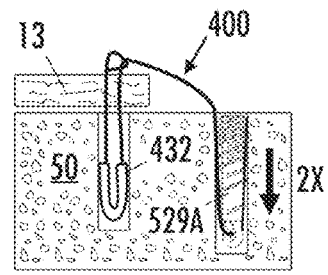
FIG. 26F
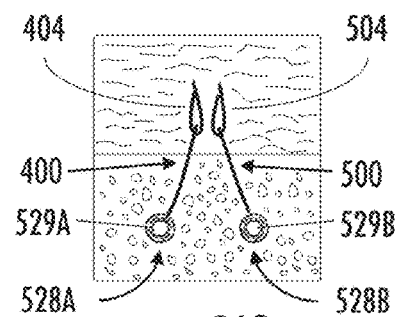
FIG. 26D  FIG. 26E  FIG. 26G

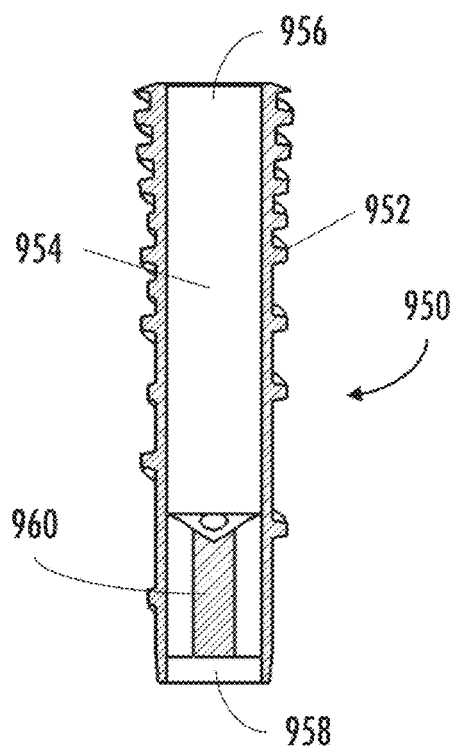
FIG. 29
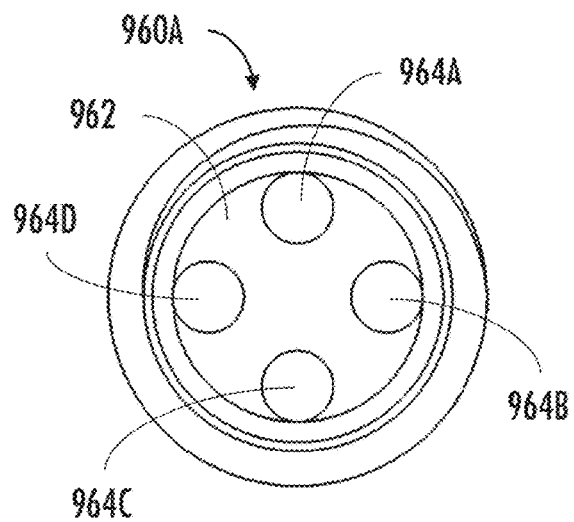 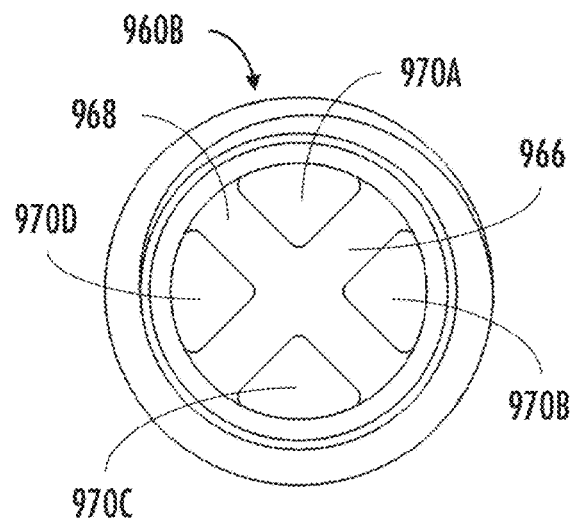
FIG. 30A FIG. 30B

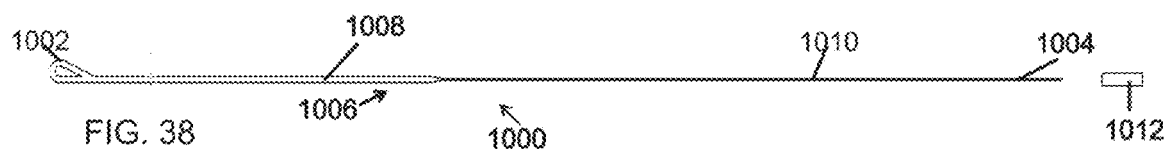
FIG. 38
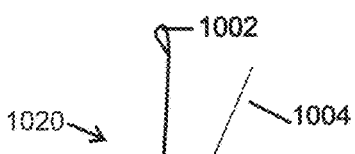
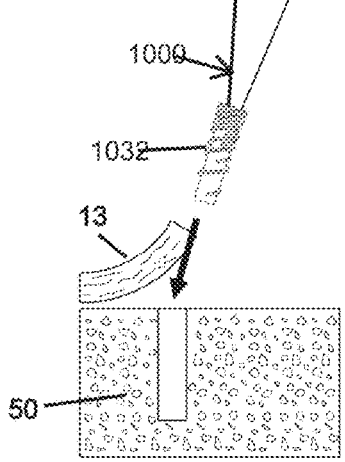
FIG. 39A
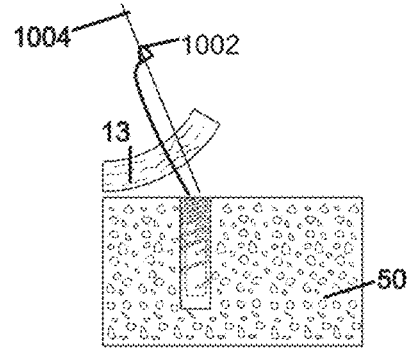
FIG. 39B    FIG. 39C
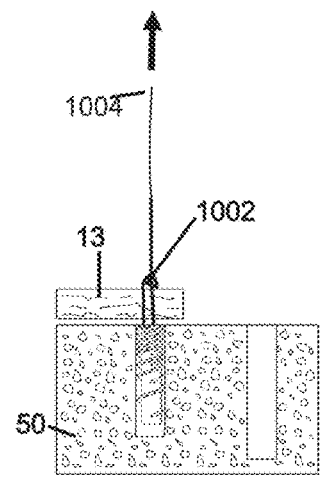
FIG. 39D
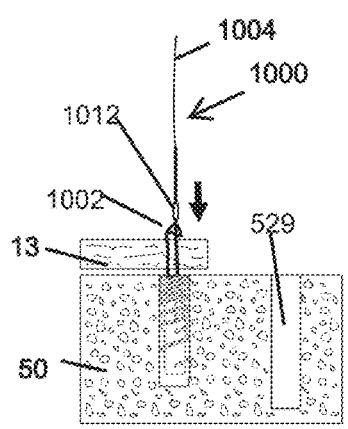
FIG. 39E
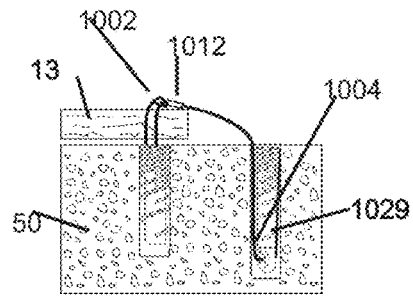
FIG. 39F

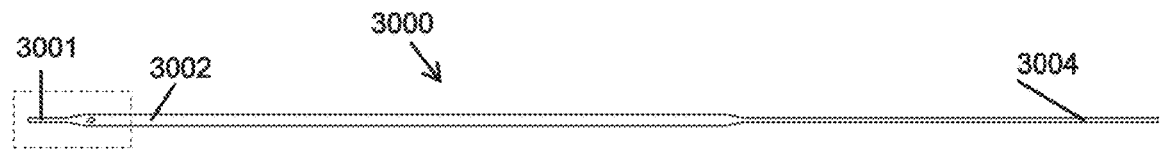
FIG. 43A
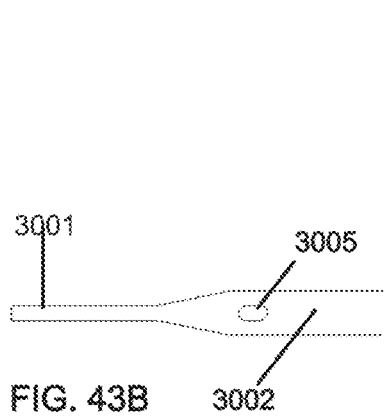
FIG. 43B
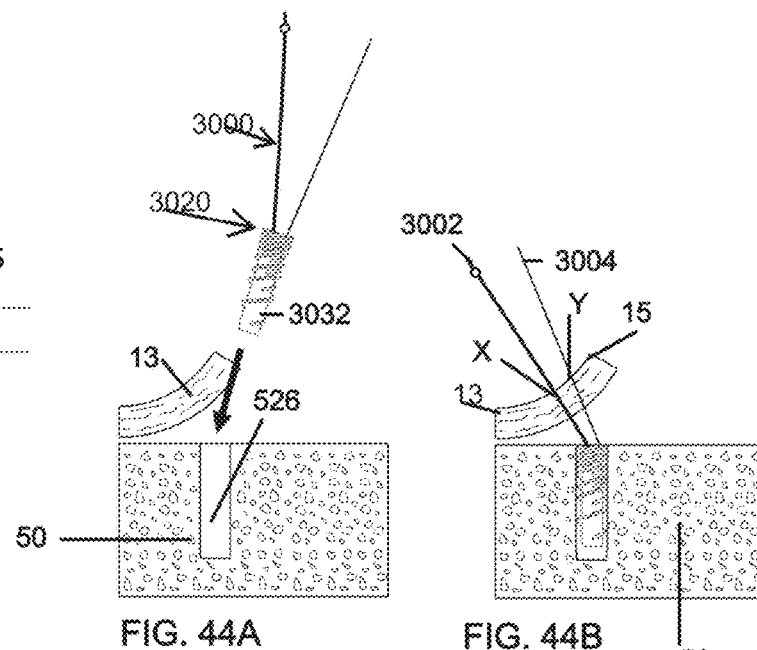
FIG. 44A
FIG. 44B
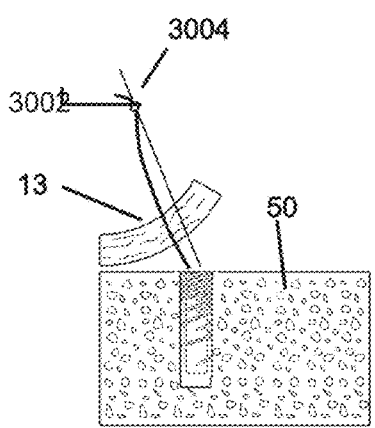
FIG. 44C
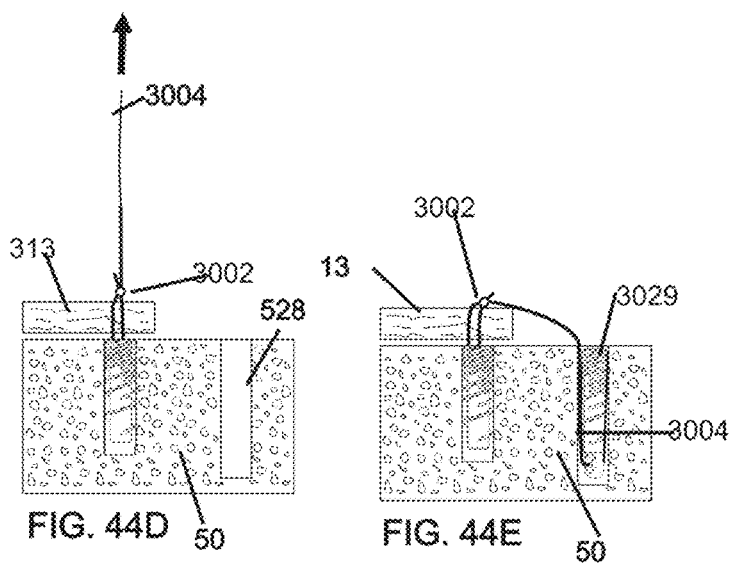
FIG. 44D
FIG. 44E

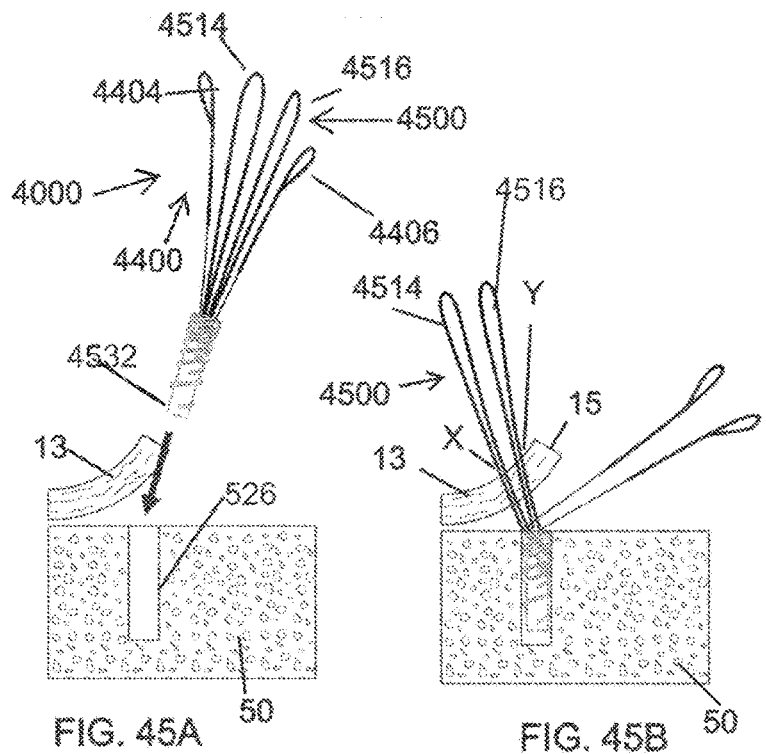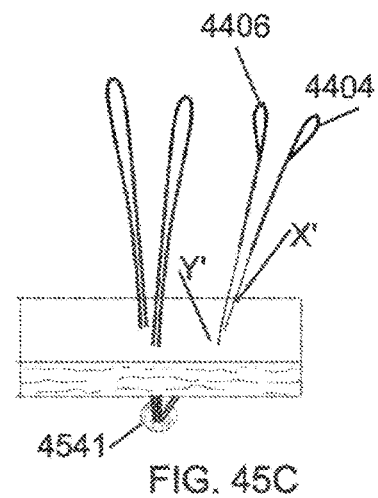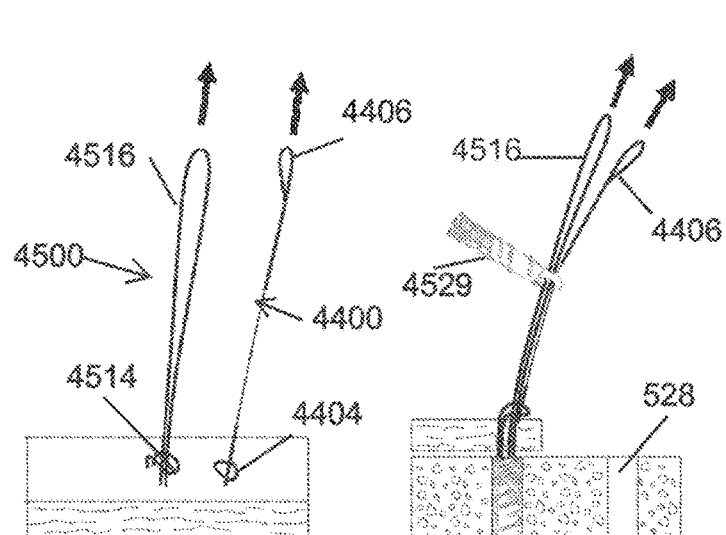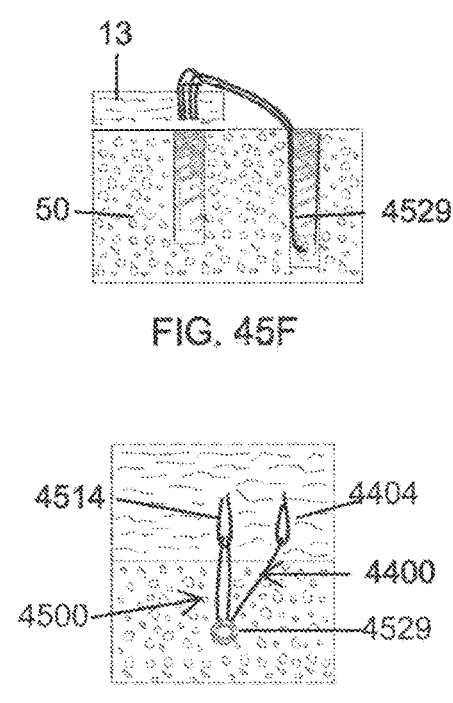
FIG. 45A  FIG. 45B  FIG. 45C  FIG. 45D  FIG. 45E  FIG. 45F  FIG. 45G

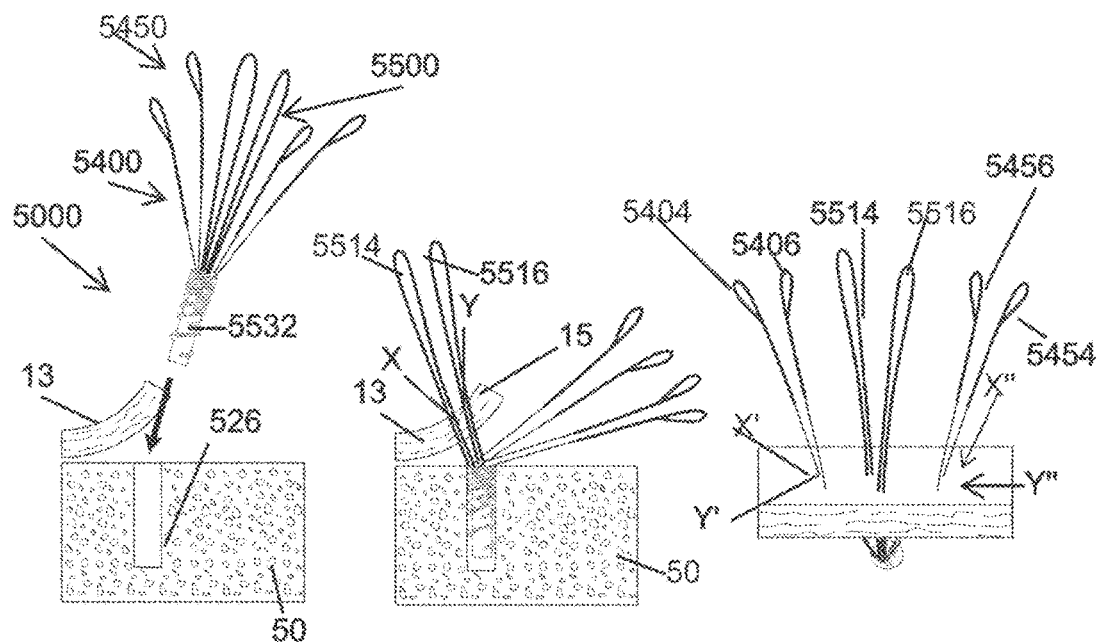
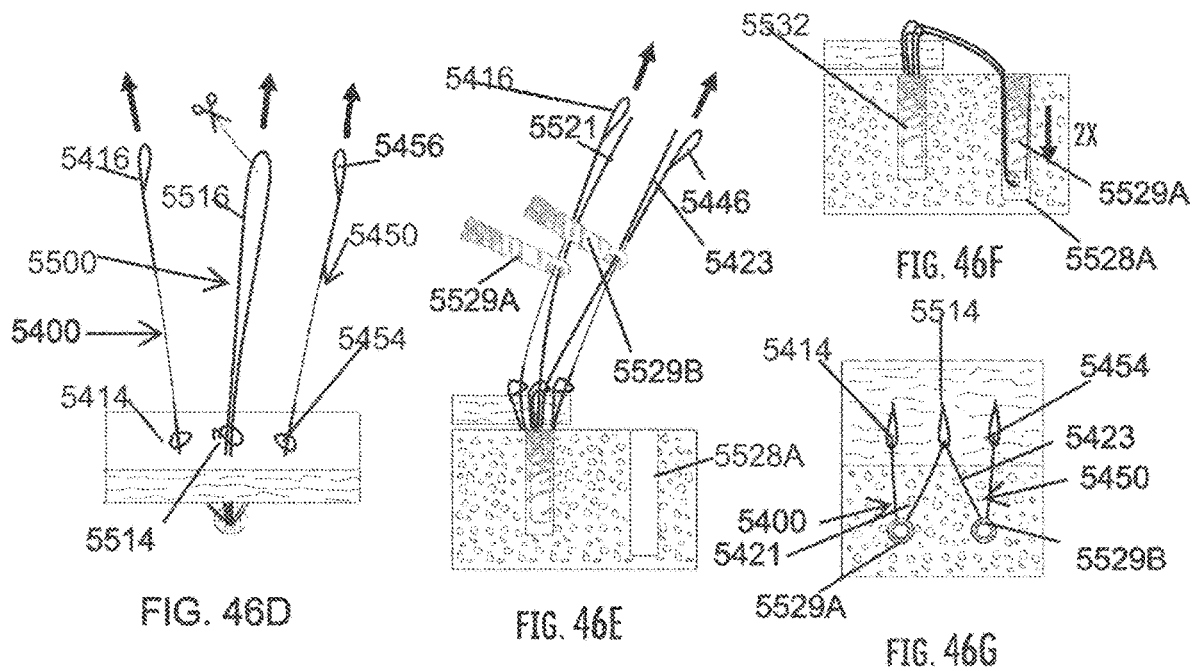
FIG. 46A  FIG. 46B  FIG. 46C
FIG. 46D  FIG. 46E  FIG. 46F  FIG. 46G

LUGGAGE TAG SUTURE ASSEMBLIES AND RELATED SURGICAL TECHNIQUES

CROSS-REFERENCE TO RELATED APPLICATIONS

This application is a continuation-in-part of U.S. nonprovisional patent application Ser. No. 17/736,006, filed May 3, 2022, which is a continuation of U.S. nonprovisional patent application number of Ser. No. 17/553,646, filed Dec. 16, 2021, now U.S. Pat. No. 11,350,926. The entire contents of each of these applications are incorporated herein by reference.

BACKGROUND OF THE INVENTION

1. Field of the Invention

The present disclosure relates in general to tissue repair surgery, and more particularly, to a sutures, anchors, and techniques for attaching tissue to tissue.

2. Background Art

Soft tissues such as ligaments and tendons can sometimes detach from their associated bones as a result of repeated stress, acute trauma, or degeneration due to age. Partial detachment can often be managed with a combination of treatments including physical therapy, rest, acetaminophen, anti-inflammatory drugs, and steroids. However, full detachment usually requires surgery.

One common soft-tissue-to-bone reattachment procedure is rotator cuff repair, which involves reattaching a rotator cuff tendon to the head of the humerus. Rotator cuff repair can be fully open, arthroscopic, or mini-open, and can be performed using knotted or knotless techniques. A typical knotted repair technique involves loading a suture strand having two free ends into a suture anchor, implanting the suture anchor in a bone below a torn rotator cuff tendon, passing the two free ends of the suture in a bottom-to-top direction through the tendon, and then using the free ends to tie a knot securing the tendon to the bone. In a knotless repair technique, the two free ends of the suture are, instead of being tied, passed through the distal end of a second suture anchor, which is then be implanted in the bone, trapping the suture ends in an interference fit between the anchor and the bone.

Many surgeons prefer knotless repair techniques since they require less technical expertise and are less time-consuming than knotted repair techniques. In addition, knots can be bulky and can cause impingement of the tendon on the bone. However, knotless techniques can also be problematic since they allow relative movement between the tendon and the suture. In addition, suture slippage can occur if the interference fit between a knotless suture anchor and the surrounding bone is not sufficiently tight, as is frequently the case in patients having diminished bone density due to age or disease. Another problem of both knotted and knotless repair techniques is anchor pullout, which can occur as a result of trauma or diminished bone density. Still another problem is the formation of undesirable flaps or folds known as "dog-ear" lesions between sutures or knots, which can result in impingement and compromise the quality of repair.

These and other problems are addressed by the techniques and devices summarized below, which can also be applied to a variety of other types of surgery including tissue repair, soft-tissue-to hard-tissue attachment, and hard-tissue-to-hard-tissue attachment.

SUMMARY OF THE INVENTION

The present disclosure relates to various methods of tissue attachment surgery utilizing a "luggage tag" configuration, and to devices for facilitating these methods.

In one aspect of the disclosure, a method for repairing tissue includes obtaining a suture, the suture including a first end defining an opening and a second end capable of passing through the opening; passing the first end through the tissue at a first location; passing the second end through the tissue at a second location; forming a luggage tag configuration by passing the second end through the first end; and securing the luggage tag configuration against the tissue.

In some versions of the method, the suture may include a flat portion having a predetermined width and a round portion having a predetermined diameter that is less than the predetermined width.

In some versions of the method, the suture may comprise a continuous loop having a first bight at the first end and a second bight at the second end, where the opening is defined between the first bight and the tissue, and forming the luggage tag configuration includes passing the second bight through the opening.

In other versions of the method, the suture may be a "barbell" suture including a first loop formed at the first end, a second loop formed at the second end, and a linear central portion connecting the two loops. In these versions, forming the luggage tag configuration includes passing the second loop through the first loop.

In other versions of the method, the first end of the loop comprises a loop, the second end comprises a linear tail, and forming the luggage tag configuration includes passing the tail through the loop.

In some versions of the method, the suture is anchorless.

In other versions of the method, the suture is disposed within a suture anchor having an open proximal end, an inner wall defining a cannulation, and a suture engagement feature. Securing the luggage tag configuration against the tissue may include locking a thick portion of the suture in an interference fit between the suture engagement feature and the inner wall of the anchor body.

In some versions of the method, securing the luggage tag configuration includes inserting the second end of the suture into a distal tip of a lateral row anchor into a bone underlying the tissue. The lateral anchor may comprise a proximal anchor body mounted for longitudinal movement toward a distal tip, and mating screw threads coupled to a distal portion of the anchor body and a proximal portion of the distal tip.

In some versions of the method, the suture is embedded in an all-suture anchor.

In some versions of the method, the first end of the suture has a flat cross-section and includes a hole, and the second end of the suture is round with a predetermined diameter that is less than the diameter of the hole. Forming the luggage tag configuration comprises pulling the second end through the hole.

In some versions of the method, a sleeve is formed on the first end of the suture, and forming the luggage tag configuration comprises pulling the second end through the sleeve.

In some versions of the method, securing the luggage tag configuration against the tissue comprises sliding a sleeve over the second end of the suture.

In some versions of the method, the suture is disposed within a suture anchor having an open proximal end, an inner wall defining a cannulation, and a suture engagement feature, where the suture engagement feature extends transversely across the cannulation and defines at least two openings. The suture has been doubled on itself such that the first and second ends extend out opposite sides of the open proximal end, and the central portion passes through the openings in the suture engagement feature. The suture may include a first portion having a round profile and a predetermined diameter and a second portion having a thickness which is greater than the predetermined diameter. Each of the openings in the suture engagement feature may be large enough to allow the first portion of the suture to easily pass through, but small enough to prevent the second portion from passing through.

In another aspect of the disclosure, a "barbell" suture includes a linear central portion having a first end a a second end, with a first loop formed at the first end and a second loop formed at the second end. The loops may be formed of suture tape, with a flat profile and a predetermined thickness, while a central portion joining the two loops may be formed of suture filament or wire, with a round profile and a diameter that is less than the predetermined thickness of the loops The barbell suture may be part of a barbell suture assembly wherein the barbell suture is disposed within a suture anchor such that the first loop and second loops extend out of opposite sides of the open proximal end. In some versions, the barbell suture assembly may include a second barbell suture.

Various versions of the barbell suture assembly described above may be used in a methods of surgical repair wherein the suture anchor is implanted in a first tissue; the first loop of the barbell suture is passed through a second tissue at a first location; the second loop of the barbell suture is passed through the second tissue at a second location; the second loop is passed through the first loop to form a luggage tag configuration; and the luggage tag is secured against the second tissue.

In one version of the barbell suture, the first and second loops each have a flat profile and a predetermined thickness, and the linear central segment has a round profile and a predetermined diameter that is less than the predetermined thickness.

In another aspect of the disclosure, a suture comprises a closed loop of continuously braided suture material. The loop includes a first portion having a round profile and a predetermined diameter, and a second portion having a flat profile and a thickness which is greater than the predetermined diameter. The suture may be used without an anchor, or it may be disposed within a suture anchor.

In another aspect of the disclosure, a suture assembly comprises a suture anchor including an open proximal end, and a suture including a first end defining an opening and a second end capable of passing through the opening. The suture is positioned in the suture anchor such that the first and second ends pass out of opposite sides of the open proximal end.

In another aspect of the disclosure, a method of repairing tissue includes passing the first loop of a barbell suture through a tissue at a first location; passing the second loop of a barbell suture through the tissue at a second location; forming a luggage tag configuration by passing one of the loops through the other loop; and securing the luggage tag against the tissue.

In another aspect of the disclosure, a barbell suture assembly includes a suture anchor and a barbell suture. The barbell suture has a linear segment including a first end and a second end; a first loop formed at the first end; and a second loop formed at the second end. The suture may include a thin portion and thick portion. The barbell suture is positioned in the suture anchor such that the first loop extends out the first side of the open proximal end and the second loop extends out a second side of the open proximal end. The barbell suture assembly may also include a second barbell suture positioned in the suture anchor in the same way as the first barbell suture.

In another aspect of the disclosure, a method of repairing tissue using a barbell suture assembly includes implanting the anchor of the above suture assembly in a first tissue, passing the first loop of the barbell suture through an overlying second tissue at a first location; passing the second loop of the barbell suture through the second tissue at a second location; forming a luggage tag configuration by passing one of the loops through the other loop; and securing the luggage tag against the tissue. The second loop may be inserted into the distal tip of a lateral row anchor which is then implanted in the first tissue.

In still another aspect of the disclosure, a suture assembly comprises a suture and a suture anchor. The suture has a first end, a second end, and central portion. The suture anchor includes an anchor body having an open proximal end, an inner cannulation, and a suture engagement feature extending transversely across the inner cannulation and defining at least two openings. The suture is doubled on itself such that the first and second ends extend out opposite sides of the open proximal end and the central portion passes through the openings in the suture engagement feature. The suture may include a first portion having a round profile and a predetermined diameter and a second portion having a flat profile and a thickness which is greater than the predetermined diameter. Each of the openings in the suture engagement feature may be large enough to allow the first portion of the suture to easily pass through, but small enough to create a close fit between the second portion and the openings.

Some versions of the suture assembly may include a second suture. In some versions, at least one of the sutures in the assembly may be a continuous loop suture. In some versions, at least one of the sutures in the assembly may be a barbell suture.

In some versions of the suture assembly, the suture anchor may include an inner cannulation communicating with the open proximal end, and a suture engagement feature extending transversely across the inner cannulation. The suture engagement feature may define at least two openings, wherein each of the openings in the suture engagement feature is large enough to allow a thin round portion of the suture to easily pass through, but small enough to prevent a thicker flat portion from passing through.

In still another aspect of the disclosure, a method for repairing tissue comprises obtaining a suture including a first end defining an opening and a second end capable of passing through the opening; passing the first end through a first section of tissue having a first edge; passing the second end through a second section of tissue having a second edge separated from the first edge by a gap; forming a luggage tag configuration by passing the second end through the first end; pulling the second end until the second edge abuts the first edge; and securing the luggage tag configuration against the sections of tissue.

BRIEF DESCRIPTION OF THE DRAWINGS

FIG. 1 shows a continuous loop suture according to a first example.

FIG. 2 shows a continuous loop suture according to a second example.

FIG. 3A shows a continuous loop suture according to a third example.

FIG. 3B shows a section through line B-B of FIG. 3A.

FIG. 3C shows a section through line C-C of FIG. 3A.

FIG. 4A represents a suture assembly according to one example.

FIG. 4B represents a suture assembly according to another example.

FIGS. 5A-F show a method of repairing torn tissue.

FIGS. 7A-E show an alternate method of securing soft tissue to bone.

FIGS. 9A-F shows another method of securing soft tissue to bone.

FIGS. 25A-G show another method of securing tissue to bone using the suture anchor assembly of FIG. 22B.

FIGS. 26A-G show a method of securing tissue to bone using the suture anchor assembly of FIG. 22D.

FIG. 29 is a cross-sectional view of a suture anchor.

FIG. 30A is a bottom view of FIG. 29.

FIG. 30B is an alternate bottom view of FIG. 29.

FIG. 38 shows a loop-and-tail suture with a locking sleeve.

FIGS. 39A-F show a method of securing soft tissue to hard tissue using the loop-and-tail suture of FIG. 36.

FIG. 43A shows another alternate suture.

FIG. 43B is an enlarged view of area B of FIG. 43A.

FIGS. 44A-E show a method of securing soft tissue to hard tissue using the suture of FIG. 43A.

FIGS. 45A-G show an alternate method of securing soft tissue to hard tissue.

FIGS. 46A-G show a method of securing a flap of tissue to underlying hard tissue.

DETAILED DESCRIPTION OF THE PREFERRED EMBODIMENT(S)

Figure 6A:
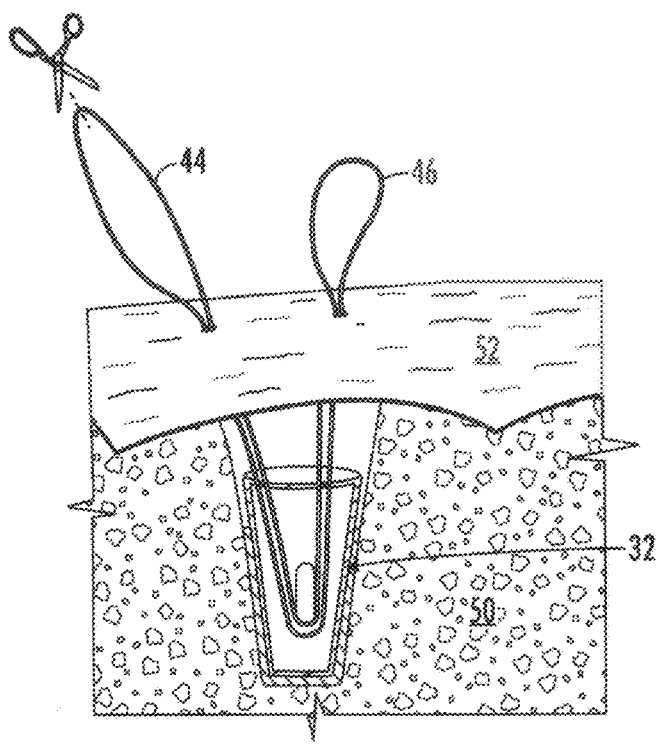
FIGS. 6A-C show a method of securing soft tissue to bone.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1, 3, and 3A show three examples of a continuous closed loop suture according to the present invention. FIG. 1 shows a thin strand of suture wire 10 formed into a continuous closed loop 12 having a first end 14, a second end 16, and two sides 18, 20. The suture wire may be formed of any natural or synthetic suture material such as silk, nylon, polyester, ultra-high molecular weight polyethylene (UHMWPE) or Poly (ethylene terephthalate), or combinations thereof, and may be monofilament or multifilament, absorbable or non-absorbable, coated or uncoated, braided or unbraided, depending on application and on the surgeon's preferences. For rotator cuff repair, #2 UHMWPE sutures are recommended.

FIG. 2 shows a strand of suture tape 110 formed into a continuous closed loop 112 having a first end 114, a second end 116, and two sides 118, 120. The suture tape 110 may be made of the same materials as suture wire 10, but is flat-braided and may have a thickness of between about 0.9 and about 2.0 mm.

FIG. 3A shows a hybrid continuous closed suture loop. The loop 212, which is braided throughout its length, has a first end 214, a second end 216, and two sides 218, 220. The loop may be made of any of the suture materials listed above. The thickness of the loop 212 has a minimum value at the first end 214 and a maximum at the second end 216. The thickness may increase gradually between the minimum and the maximum as illustrated here, or there may be a more abrupt transition, with a sustained portion (for instance, half) having the minimum thickness and another sustained portion (for instance half)) having the maximum thickness. Laser markings 222 or other indicia may be provided at the second end 216 to help the surgeon quickly find the thickest part of the suture loop. In one example, the thin end 214 of the loop has a round profile, as shown in FIG. 3B, and may have the thickness of a #2 suture, and the thick end 216 has a flat profile, as shown in FIG. 3C and may have a thickness of 1.3 mm or more.

FIG. 4A is a schematic drawing showing a suture assembly 30 including a single suture loop 12 and suture anchor 32. The suture anchor 32, which may be made of any conventional suture anchor material such as titanium, Poly-L-lactic acid (PLLA), or polyetheretherketone (PEEK), includes an anchor body 34 having an inner cannulation 36, an open proximal end 38, a distal end 40, and a suture engagement feature 42 disposed near the distal end 40. The suture loop 12, which may be formed of suture wire as in FIG. 1, suture tape as in FIG. 2, or a varying-width strand as in FIG. 3A, has been doubled on itself to form a first end bight 44, second end bight 46, and a central bight 48, and is positioned in the inner cannulation 36 of the anchor 32 such that each of the end bights 44, 46 extends in a proximal direction through the open proximal end 38 of the anchor, and the central bight 48 extends around the suture engagement feature 42, which may also be referred to as a suture bridge. At some point, certain surgical techniques may require cutting through one or both end bights 44, 46 to divide the loop into separate strands, as will shortly be described below.

FIG. 4B shows an alternate suture assembly 430 including a soft, all-suture anchor 432, rather than the hard anchor 32 of FIG. 4A. Suture loop 412, which may have the same structure as loop 12 in FIG. 1, loop 112 in FIG. 2, or loop 212 in FIG. 3, is woven through or otherwise embedded in a collapsible woven tube or sleeve 434, similar to the sleeves found in the Bio-met Juggerknotless® and other commercially available all-suture knotless suture anchors. The sleeve 434, which is made of the same material as, and may be integral with, the suture loop 412, is bent into a U-shape having a first side 433, second side 435, and two proximal openings 437, 439. The suture loop 412 has been doubled on itself to form a first end bight 444, second end bight 446, and is embedded in the sleeve 434 such that the first end bight 444 extends proximally through the first proximal opening 437 in the first side 433, and the second end bight 446 extends proximally through the second proximal opening 439 in the second side 435. When the all-suture anchor 432 is inserted in a pre-drilled hole in a bone and the end bights 444, 446 are pulled, the sleeve 434 collapses in the longitudinal direction and expands in the radial direction, exerting a contact force against the walls of the pre-drilled hole. An advantage of an all-suture anchor 432 as shown in FIG. 4B is that it requires a smaller diameter hole than that required for the conventional hard anchor 32 of FIG. 4A.

FIGS. 5A-F illustrate an anchorless method for repairing torn tissue using a free (anchorless) continuous suture loop 20 of the type shown in FIG. 1, although a tape loop 112 of the type shown in FIG. 2, or a varying width loop 220 or 250 as shown in FIG. 3A or 3B could also be used. The first end 14 of the suture loop 20 is pulled in a proximal direction through a first section of tissue 13 having an edge 15, and the second end 16 of the suture loop 20 is pulled through a second section of tissue 17 having an edge 19, which is separated from the edge 15 of the first section of tissue 13 by a gap 21, as shown in FIG. 5A. Then, the second end 16 of the suture loop 20 is cut open as shown in FIG. 5B, dividing it into first and second limbs 22, 23, one of which is inserted through the first end 14 of the suture loop 20, as shown in FIG. 5C. The two limbs 22, 23 are pulled proximally, causing the two tissue sections 13, 17 to move towards one another and the first end 14 of the loop 20 to move towards the tissue flaps 13, 17. This action continues until the edges 15, 19 of the sections 13, 17 abut one another and the gap 21 is essentially eliminated, as shown in FIG. 5E. At this point, the first end 14 of the suture loop 20 lies flat against the tissue flaps 13, 17, and forms a "luggage tag" configuration with the first limb 22. The first and second limbs 22, 23 are tied together using half-hitches or the like to form a knot 24, which is tightened against the tissue sections 13, 17, and then trimmed, as shown in FIG. 5F.

The two tissue sections 13, 17 may be two different portions of a single tissue that has torn, or they may be two different tissues that a surgeon wishes to join together. Both sections may be the patient's native tissue, or one of the tissues may be a graft.

Figure 6B:
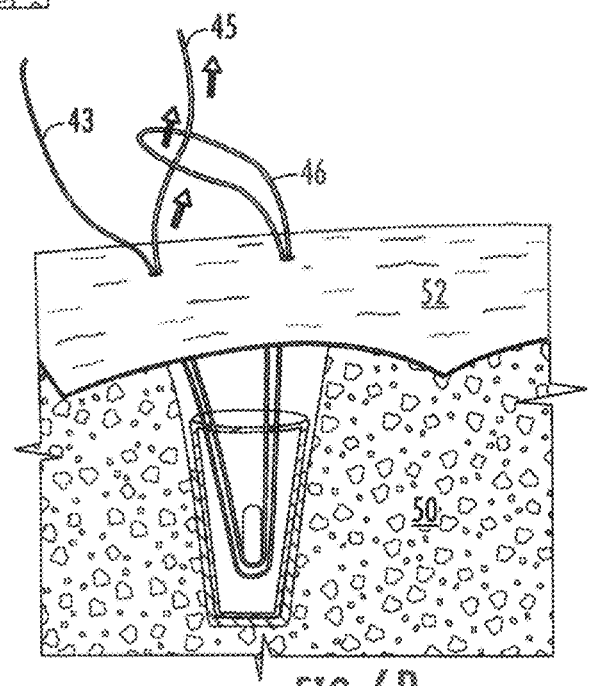
Figure 6C:
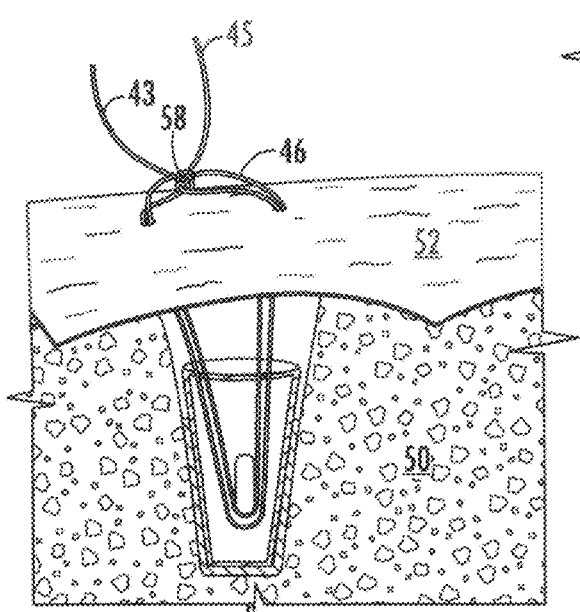

FIGS. 6A-C show a technique similar to the technique of FIGS. 5A-F, used to connect soft tissue 52 to hard tissue such as a bone 52. Instead of a free suture loop, this technique uses the suture assembly 30 of FIG. 4A, wherein the suture loop 20 is preloaded in a suture anchor 32. Initially, the suture anchor 32 is implanted in a bone 50 such as, for instance, a humerus bone, beneath tissue 52 such as a rotator cuff tendon, and the end bights 44, 46 are passed in an upward direction through the tendon 52, as shown in FIG. 6A. Next, the first end bight 44 of the suture loop 12 is passed through the second end bight 46 to create a luggage tag configuration, as shown in FIG. 5B. The limbs 43, 45 are pulled until the second end bight 46 is flattened against the tendon 52, compressing the tendon 52 against the bone 50; and finally, the limbs 43, 45 are tied together using half-hitches or the like to form a knot 58, as shown in FIG. 5C. At this point, the limbs 43, 45 may either be trimmed as shown or, if extra security is desired, inserted into a lateral anchor.

FIGS. 7A-E show an alternate method for securing soft tissue such as a tendon to hard tissue such as a bone using a free suture loop 20. Initially, the two end bights 14, 16 of the suture loop 20 are pulled proximally through a flap of soft tissue 13 to one side of a hole 26 that has been drilled in the underlying hard tissue 50. The first end bight 14 is pulled through a first point x in the tissue flap 13, and the second end 16 of the suture loop 20 is pulled proximally through a second point y in the tissue flap 13, where the second point y is located between the first point x and the edge 15 of the tissue flap 13, as shown in FIG. 7A. Next, the second end bight 16 of the suture loop 20 is inserted through the first end bight 14 of the loop 20 and pulled proximally, forming a "luggage tag" configuration as shown in FIG. 7B. It is important that the second end bight 16 (ie. the end bight nearest the edge 15 of the tissue flap 13) be inserted through the first end 14 bight, as this will tighten the "luggage tag" when the second end 16 is pulled outwardly (ie. in the direction of the hole 26), whereas inserting the first end bight 14 (the end farthest from the edge 15 of the tissue flap 13) through the second end bight 16 will loosen the "luggage tag" when the first end bight 14 is pulled outwardly.

Next, the second end bight 16 of the suture loop 20 is inserted through an eyelet 27 in a lateral anchor 29 and pulled proximally and outwardly until the first end bight 14 is flattened against the tissue 13, compressing the tissue against the bone 50, as shown in FIG. 7C. The surgeon then implants the lateral anchor 29 in the bone hole 26 as shown in FIG. 5D. This traps the limbs 14, 16 in an interference fit between the anchor 60 and the bone 50 and holds the tendon 52 tightly in place against the bone 50, as shown in the side view FIG. 7D and the plan view of FIG. 7E.

FIGS. 8A-D show a technique similar to that shown in FIGS. 7A-E, except that a suture assembly 30 having an anchor 32 is used, rather than a free suture loop. Initially, the suture anchor 32 is implanted in a bone 50 such as, for instance, a humerus bone, beneath tissue 52 such as a rotator cuff tendon, and the end bights 44, 46 are passed in an upward direction through the tendon 52, as shown in FIG. 5A. Next, the first end bight 44 of the suture loop 12 is passed through the second end bight 46 to create a luggage tag configuration, as shown in FIG. 5B. The first end bight 44 is pulled upwardly until the second end bight 46 is flattened against the tendon 52, compressing the tendon against the bone 50, as shown in FIG. 5C. The surgeon may optionally cut through the first end bight 44, separating it into two distinct limbs 54, 56. The two limbs 54, 56, whether separated or not, are then inserted through the distal end of a lateral suture anchor 60 which is subsequently implanted in the bone 50, as shown in FIG. 5D. This traps the limbs 54, 56 in an interference fit between the anchor 60 and the bone 50 and holds the tendon 52 tightly in place against the bone 50.

FIGS. 9A-F show a technique similar to that shown in FIGS. 7A-E except that two lateral anchors 29, 35 are used instead of a single lateral anchor 29. Initially, the two end bights 14, 16 of a free suture loop 20 are pulled proximally through a flap of soft tissue 13 to one side of a first lateral bone hole 26A that has been drilled in the underlying hard tissue 50. The first end bight 14 is pulled through a first point x in the tissue flap 13, and the second end bight 16 of the suture loop 20 is pulled proximally through a second point y in the tissue flap 13, where the second point y is located between the first point x and the edge 15 of the tissue flap 13, as shown in FIG. 9A. Next, the second end bight 16 of the suture loop 20 is inserted through the first end bight 14 of the loop 20 and pulled proximally, forming a "luggage tag" configuration as shown in FIG. 9B. The second end bight 16 is then cut open as shown in FIG. 9C, dividing it into first and second limbs 22, 23, which are inserted through eyelets 27, 31 in first lateral anchor 29 and second lateral anchor 35, respectively, as shown in FIG. 9D. The first lateral anchor 29 is then implanted in a first the first lateral bone hole 26A and the second lateral anchor is implanted in a second lateral bone hole 26B, as shown in FIGS. 9E and F. This traps each limb 22, 23 in an interference fit between its respective anchor 26A or B and the surrounding bone 50, thus holding the tissue firmly in place.

The techniques illustrated in FIGS. 5A-D, 6A-C, 7A-E, 8A-D, and 9A-F may be performed using any of the suture loops shown in FIGS. 1, 2, 3A and 3B. If one of the varied-thickness loops 1 of 212 of FIG. 3A or B is used, the first end bight should include the thinner end of the loop and the second end bight should include the thicker end of the loop since this will create a closer fit between the suture and the anchor. Thus, the thicker end forms a strong, secure base for the luggage tag, and the thinner end has the easy manipulability desired for knot-tying.

In addition, the suture assembly 430 of FIG. 4B may be substituted for the suture assembly of FIG. 4A in the techniques of 6A-C and 8-D. Use of an all-suture anchor 432 may eliminate the need for steps 6C and 8D in these techniques, since the contact force exerted by the collapsed sleeve on the walls of the hole provides the same auxiliary locking function as the knot in FIG. 6C or the interference fit between the second suture anchor 60 and the bone 50 in FIG. 8D.

The techniques illustrated in FIGS. 6A-C and 8-D may also be combined with other known techniques to provide a surgeon with a wide variety of options. For instance, the suture anchor may be loaded with multiple sutures to create luggage tag configurations at multiple fixation points between the bone and the tendon, and multiple anchors may be used to create double row suture bridges.

Figure 8A:
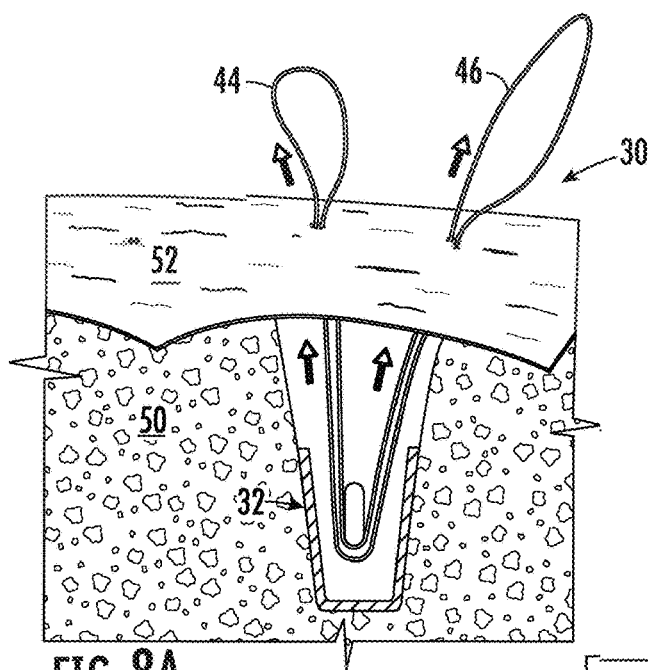
FIGS. 8A-D show another method of securing soft tissue to bone.
Figure 8B:
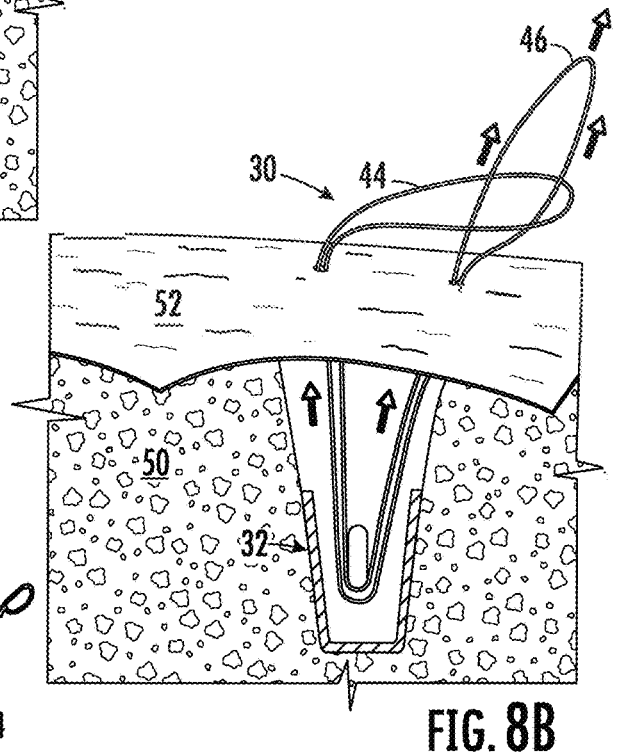
Figure 8C:
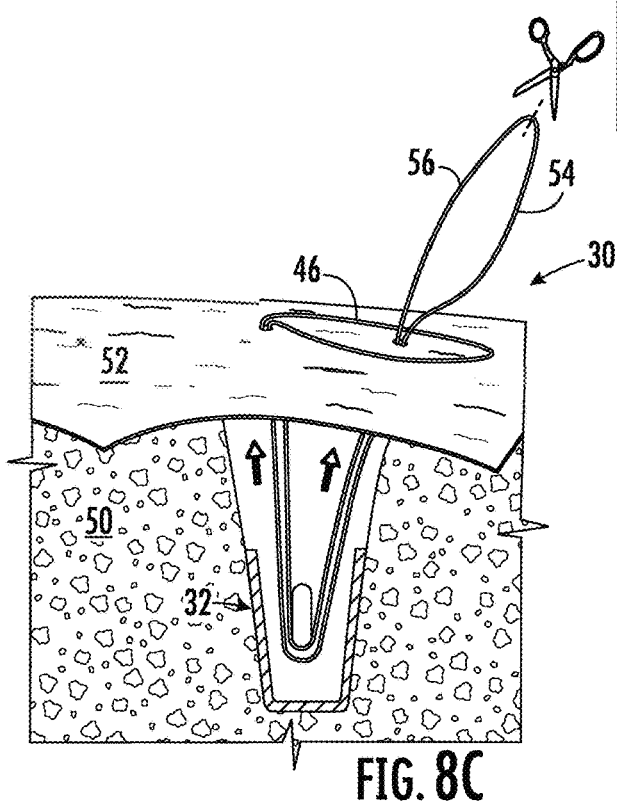
Figure 8D:
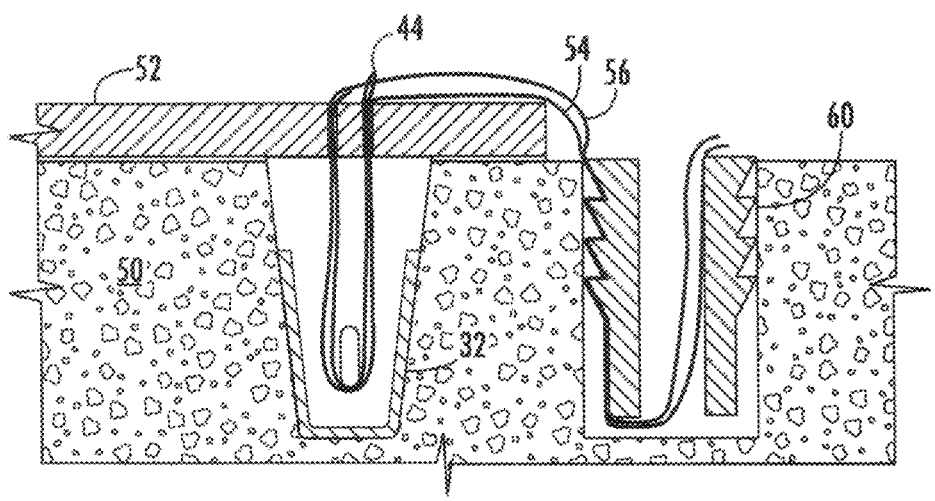

In the above examples using a lateral anchor, the lateral of FIG. 8D may be any type of commercially available knotless suture anchor such as the HEALIX ADVANCE™ knotless anchor by Depuy Synthes, or the PushLock™ and SwiveLock™ anchors by Arthrex. However, the fixation technique described in connection with these examples holds the tendon more securely in place than the conventional knotless techniques normally used with these anchors, since the luggage tag configuration formed at the intersection between the first end and the limbs of the second end acts as a stop preventing the tendon from sliding relative to the suture. Knots as shown in FIGS. 5E and 6C add even greater security.

Figure 10:
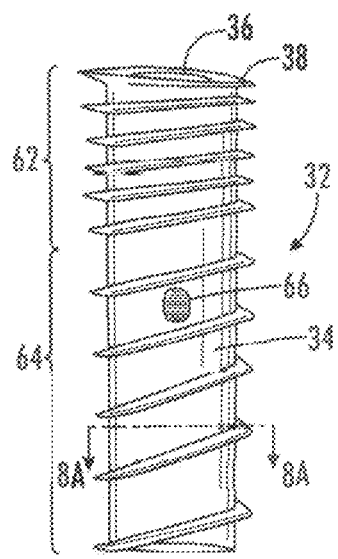
FIG. 10 shows an example of a suture anchor.
Figure 11A:
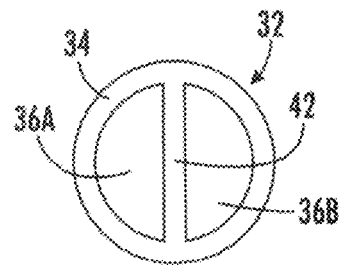
FIG. 11A shows a sectional view taken through line 8A-8A of FIG. 10.

FIG. 10 shows one example of suture anchor 32, which includes anchor body 34, inner cannulation 36, open proximal end 38, and blunt distal end 40. The anchor body 34 is double threaded, with a proximal portion 62 having a relatively small pitch and small thread diameter to core diameter ratio, giving it good purchase in cortical bone, and a distal portion 64 having a larger pitch and larger thread diameter to core diameter ratio, giving it good purchase in cancellous bone. A single vent 66 in the anchor body 34 allows bone marrow and associated stem cells to access the tendon or other soft tissue being repaired, thus promoting better healing. Suture bridge 42 extends across the inner cannulation, dividing the cross-sectional area of the inner cannulation into two equally-sized sections 36A, 36B, as shown in FIG. 11A.

Figure 11B:
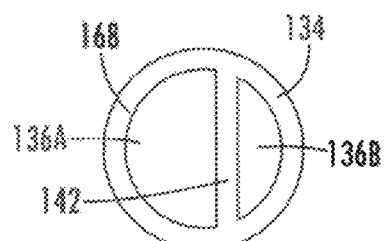
FIG. 11B shows a sectional view of a suture anchor according to an alternate example.

In an alternate example, a suture bridge 142 may be located in an off-center position, dividing the inner cannulation into a larger portion 136A and a smaller portion 136B, as shown in FIG. 11B. The cross-sectional area of the smaller portion 136B may, for instance, be about 40% of the cross-sectional area of the entire inner cannulation, and the cross-sectional area of the larger portion 136A may be about 60% of the cross-sectional area of the entire inner cannulation. This off-center location of the suture bridge may reduce slippage of the suture, since the tight spacing in the smaller portion results in increased frictional forces between the suture bridge 142, suture, and the inner side wall 168 of the anchor body 134. When the wider end of the varying width loop suture of FIG. 3 resides in the smaller portion 136B of the inner cannulation of the suture anchor, an especially close fit between the suture and the anchor is achieved.

Figure 12:
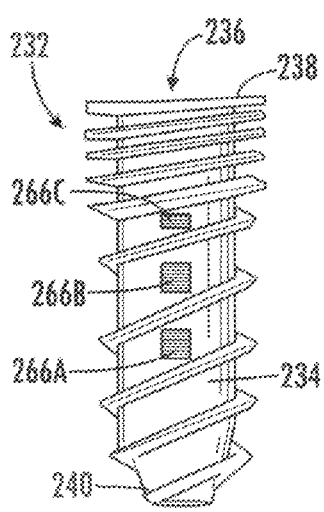
FIG. 12 shows an exterior view of a suture anchor according to another example.

In another example, shown in FIG. 12, a suture anchor 232 includes a double-threaded anchor body 234 having an inner cannulation 236 and open proximal end 238 similar to the suture anchor 32 of FIG. 7, but with a tapered distal tip 240 and three vents 266A, B, C. The tapered tip 240 facilitates penetration into bone, and the additional vents 266A, B, C allow for more bone marrow and stem cells to access the tendon, promoting even better healing. Suture anchor 232 also includes an internal suture bridge, which may be either centered, as in the example of FIG. 11A, or off to one side, as in the example of FIG. 11B.

Figure 13A:
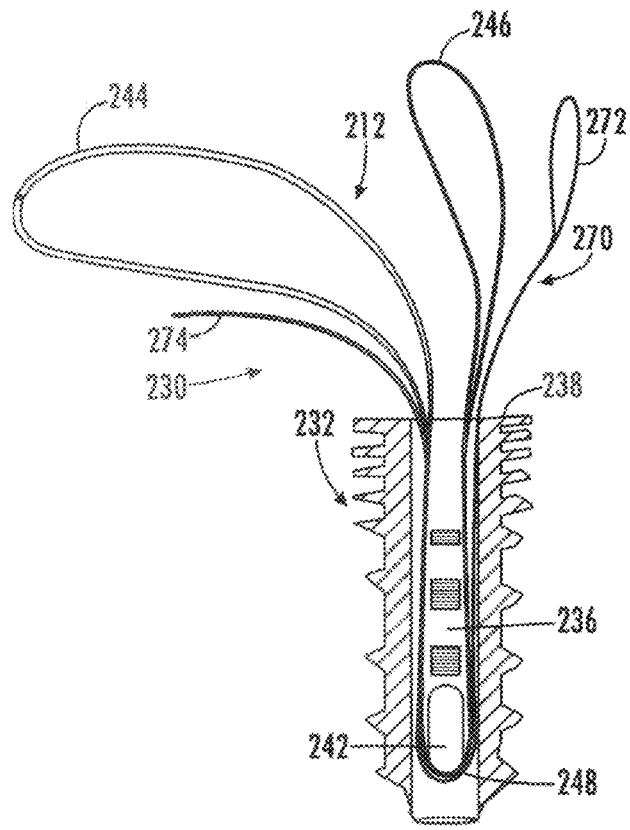
FIG. 13A represents a suture anchor assembly according to one example.

FIG. 13A shows an example of a suture assembly 230 comprising the suture anchor 232 of FIG. 12, the varying-width suture loop 212 of FIG. 3A, and a linking suture 270 comprising a looped end 272 and a straight end 274. The suture loop 212 has been doubled on itself to form a first end bight 244, second end bight 246, and a central bight 248, and positioned in the inner cannulation 236 of the anchor 232 such that each of the end bights 244, 246 extends in a proximal direction through the open proximal end 238 of the anchor and the central bight 248 extends around the suture bridge 242. The linking suture 270 has also been doubled on itself and positioned in the inner cannulation such that its looped end 272 extends proximally through the open proximal end of the anchor 232 on the same side of the anchor bridge 242 as the thin second end bight 246 of suture loop 212, and its straight end 274 extends proximally through the open proximal end of the anchor 232 on the same side of the anchor bridge 242 as the thick first end bight 244 of suture loop 212.

In other examples of suture assemblies, the varying-width suture loop 212 could be replaced with either the thin suture loop 12 of FIG. 1, the suture tape loop 112 of FIG. 2, or the hybrid loop 250 of FIG. 3A. In addition, the linking suture 270 could be replaced with any of suture loops 12, 112, 212, or 250.

Figure 13B:
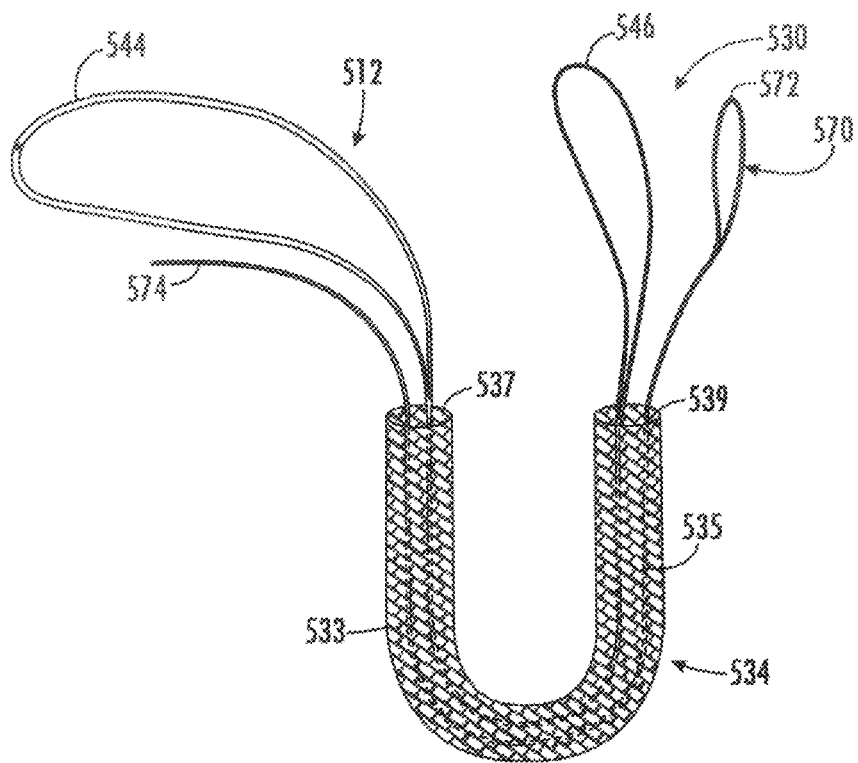
FIG. 13B represents a suture anchor assembly according to another example.

FIG. 13B shows an all-suture version of a suture assembly 530 wherein a varying-width suture loop 512 and linking suture 570 are embedded in a collapsible tube or sleeve 534 similar to the sleeve shown and described in connection with FIG. 4B. The first end bight 544 of the suture loop 512 extends proximally through a first opening 537 in the first side 533 of the sleeve 534, and the second end bight 546 of the suture loop 512 extends proximally through a second opening 539 in the second side 535 of the sleeve 534. The straight end 574 of the linking suture 570 extends through the first opening 537, together with the first end bight 544 of the suture loop 512, and the looped end 572 of the linking suture 270 extends through the second opening 539, together with the second end bight 546 of the suture loop 512.

Figure 14A:
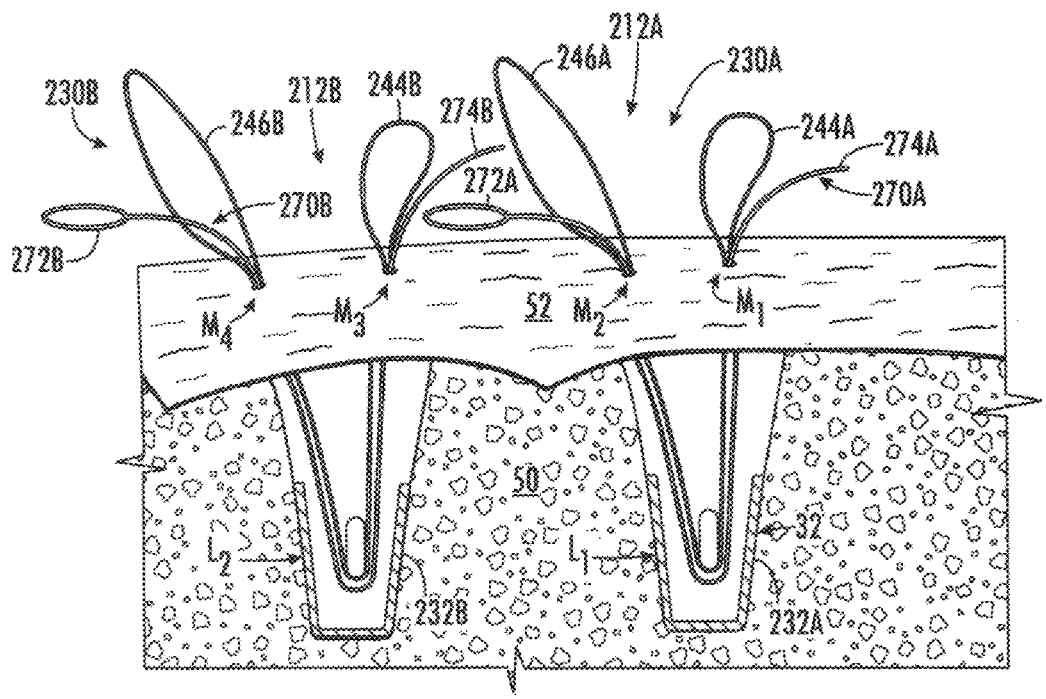
FIGS. 14A-E show a double-row method of securing soft tissue to bone.

FIGS. 14A-E illustrate a double row suture technique using two suture assemblies 230A, B. Initially, as shown in FIG. 14A, the anchor 232A of a first suture assembly 230A is implanted in a first location $L_1$ in a bone 50 such as a humerus, and the anchor 232B of a second suture assembly 230B is implanted in the bone 50 in a second location $L_2$ which defines a medial row with the first location $L_1$. The second suture assembly 230b is implanted in the same orientation as the first suture assembly 230, so that the straight end 274B of the linking suture 270B of the second suture assembly 230B faces the looped end 272A of the linking suture 270A of the first suture assembly 230A. The first, thicker, end bight 244A of the suture loop 212A of the first suture assembly 230A and the straight end 274A of the linking suture 270A of the first suture assembly 230 are passed upwardly through a first location $M_1$ in a tissue 52 such as a rotator cuff tendon above the bone 50. The second, thinner, end bight 246A of the suture loop 212A of the first suture assembly 230A and the looped end 272A of the linking suture 270A of the first suture assembly 230 are passed upwardly through a second location $M_2$ in the tissue 52. The first, thicker, end bight 244B of the suture loop 212B of the second suture assembly 230B and the straight end 274B of the linking suture 270B of the second suture assembly 230B are passed upwardly through a third location $M_3$ in the tissue 52. The second, thinner, end bight 244B of the suture loop 212B of the second suture assembly 230B and the looped end 272B of the linking suture 270B of the second suture assembly 230B are passed upwardly through a fourth location $M_4$ in the tissue 52.

Figure 14B:
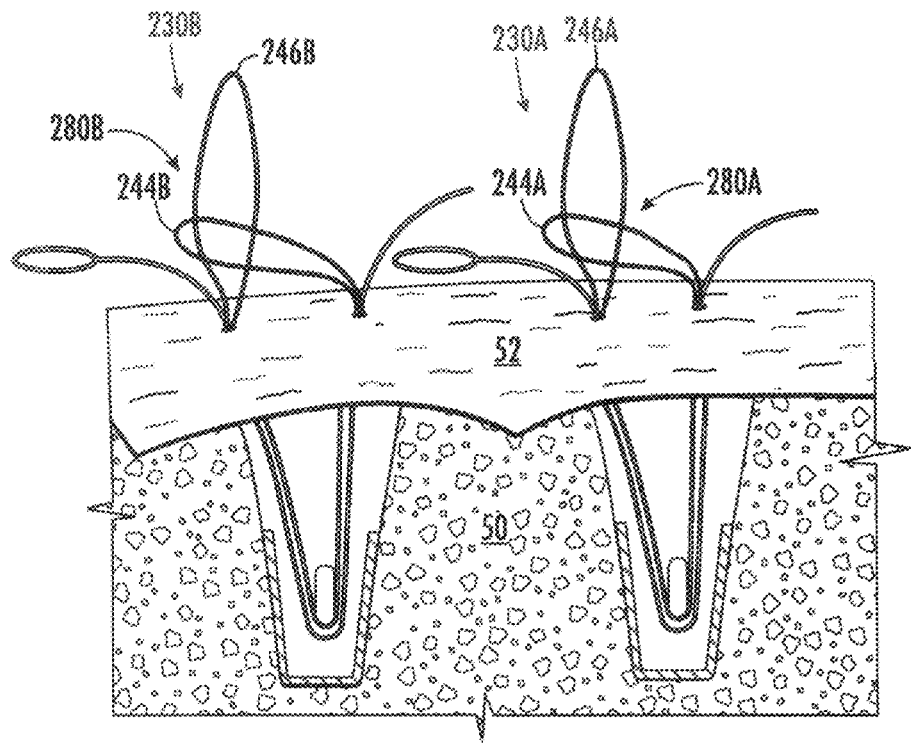

Next, the second end bight 246A of the suture loop 212A of the first suture assembly 230A is pulled through the first end bight 244A of the suture loop 212A of the first suture assembly 230A to form a first luggage tag configuration 280A, and the second end bight 246B of the suture loop 212B of the second suture assembly 230B is pulled through the first end bight 244B of the suture loop 212B of the second suture assembly 230B to form a second luggage tag configuration 280B as shown in FIG. 14B.

Figure 14C:
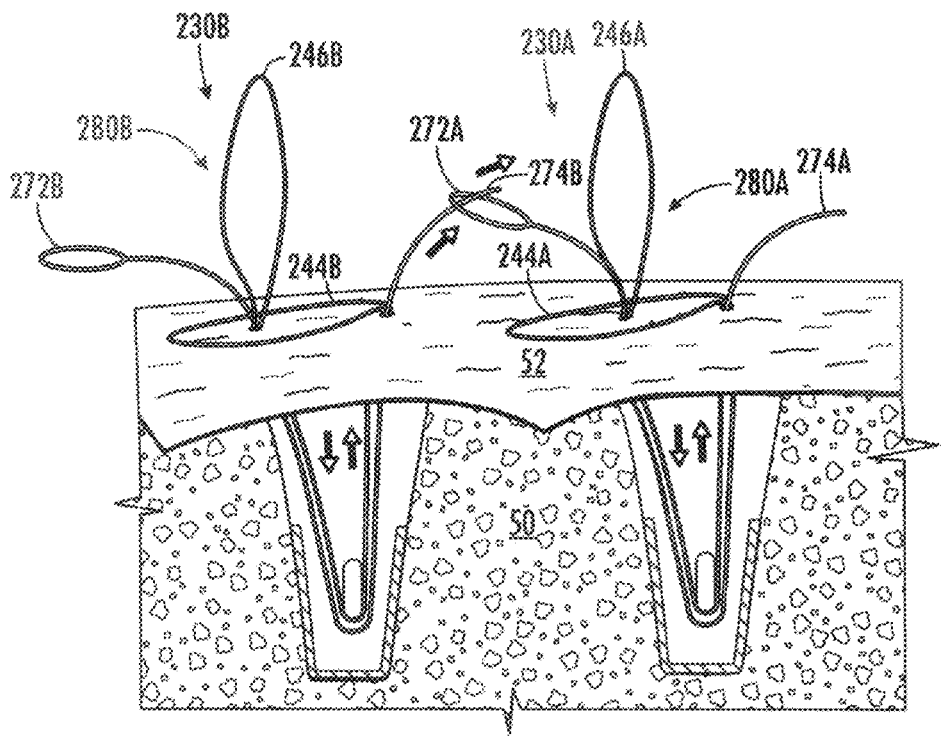
Figure 14D:
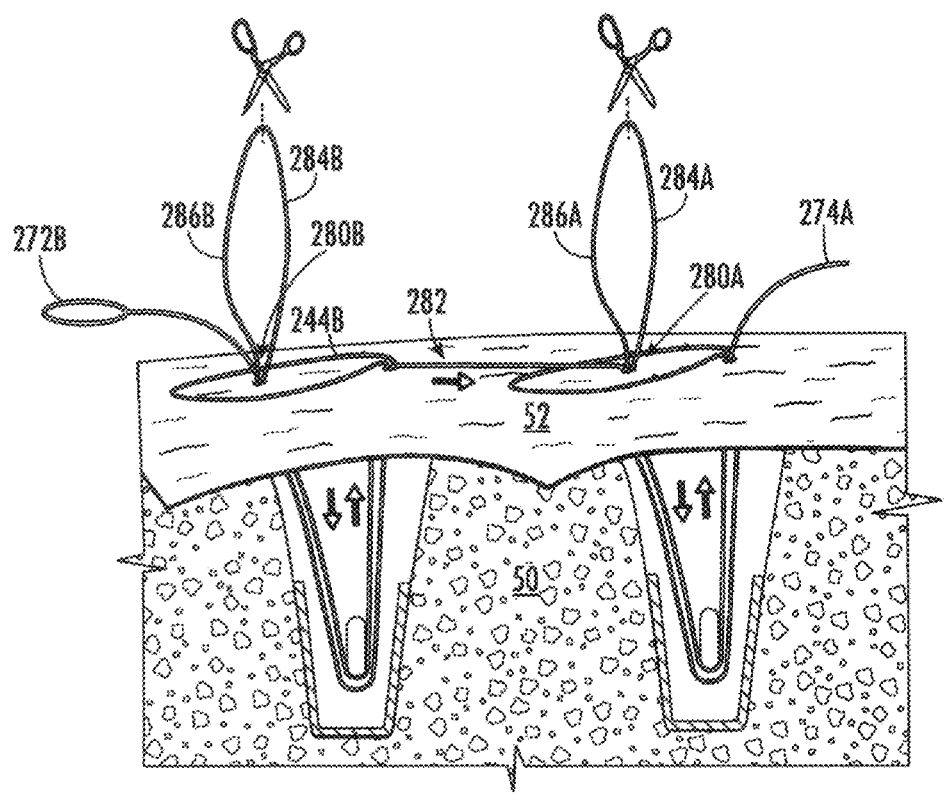

The second end bights 246A, B are pulled until the first end bights 244 A, B are flattened against the tissue 52, as seen in FIG. 14C. The straight end 274B of the linking suture of the second suture assembly 230B is then inserted through the looped end 272A of the linking suture of the first suture assembly 230A, and the straight end 274A of the linking suture of the first suture assembly 230 is pulled upwardly, drawing the straight end 274B of the linking suture of the second suture assembly 230B down through the tendon 52, and creating a medial bar 282 joining the two luggage tags 280A, 280B, as shown in FIG. 14D. The apex of each second suture loop 246 A, B is then cut, dividing the second suture loop 246A of the first suture assembly 230A into two free limbs 284A, 286A, and the second suture loop 246B of the second suture assembly 230B into two free limbs 284B, 286B.

Figure 14E:
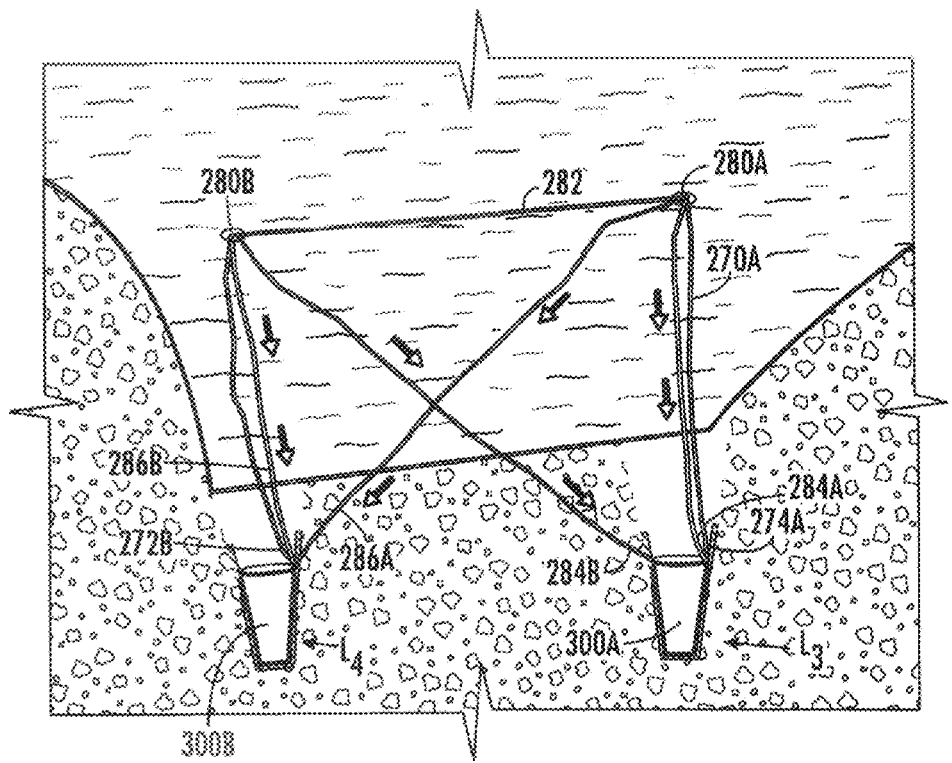

In the final steps, illustrated in FIG. 14E, the straight end 274A of the linking suture 270A of the first suture assembly, one free limb 284A of the suture loop of the first suture assembly, and one free limb 284B of the suture loop of the second suture assembly are inserted into or through the distal end of a first lateral anchor 300A, which is then implanted in a first lateral location $L_3$ in the bone 50, retaining the ends 274A, 284A, and 284B in an interference fit between the exterior of the anchor 300A and the bone 50. The looped end 272B of the second suture assembly, the remaining free limb 286A suture loop of the second suture assembly, and the remaining free limb 286B of the suture loop of the first suture assembly are inserted into or through the distal end of a second lateral anchor 300B, which is then implanted in a second lateral location La in the bone 50, retaining the ends 272B, 286A, and 286B in an interference fit between the exterior of the anchor 300B and the bone 50.

The varying-width suture loops 212 A, B used in the method of FIGS. 11A-E may be replaced by wire suture loops of the type shown in FIG. 1, the suture tape loops shown in FIG. 2 or the hybrid loops shown in FIG. 3B. Alternatively, the method of FIGS. 14A-E may be performed using the all-suture anchor assembly 530 of FIG. 103B rather than the hard suture anchor assembly 230 of FIG. 13A.

FIGS. 15-19 show a lateral anchor 300 useable in the method of FIGS. 6A-C or 8A-D as well as in the method of FIGS. 14A-E. The lateral anchor 300 includes a proximal anchor body 302 and a distal tip 304. The proximal anchor body 302 includes an inner cannulation 306 allowing it to slide along a tubular cylinder driver 308 having a closed proximal end 310 and an open distal end 312. A distal portion 313 of the inner cannulation 306 is internally threaded. A proximal portion of the inner cannulation 306 is hexagonal and accepts the distal portion of a ball end hex driver 314.

Figure 15:
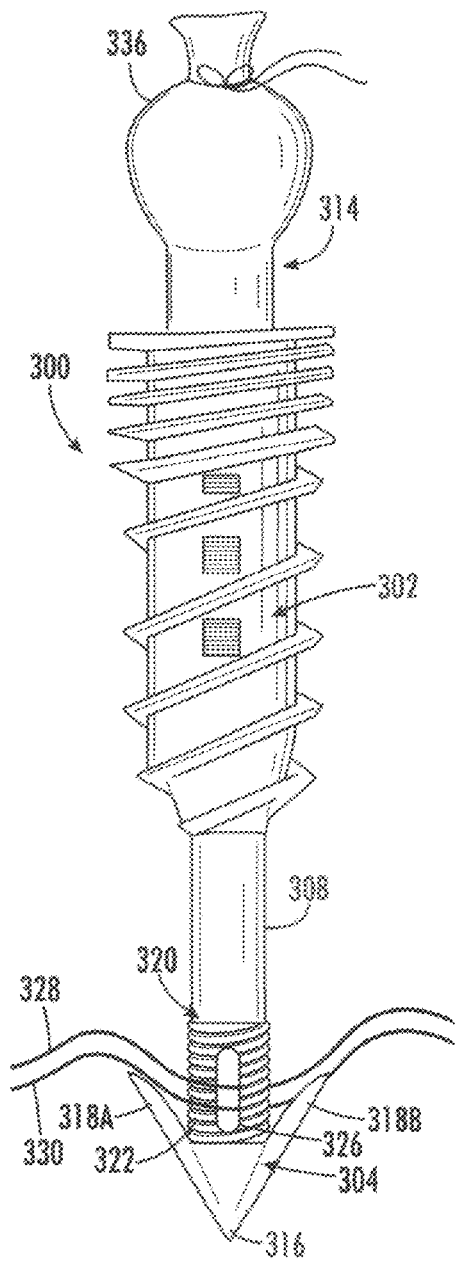
FIG. 15 is a front view of a lateral row suture anchor in a pre-deployed configuration.
Figure 16:
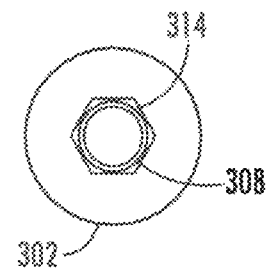
FIG. 16 is a top view of the lateral row suture anchor of FIG. 15.
Figure 17:
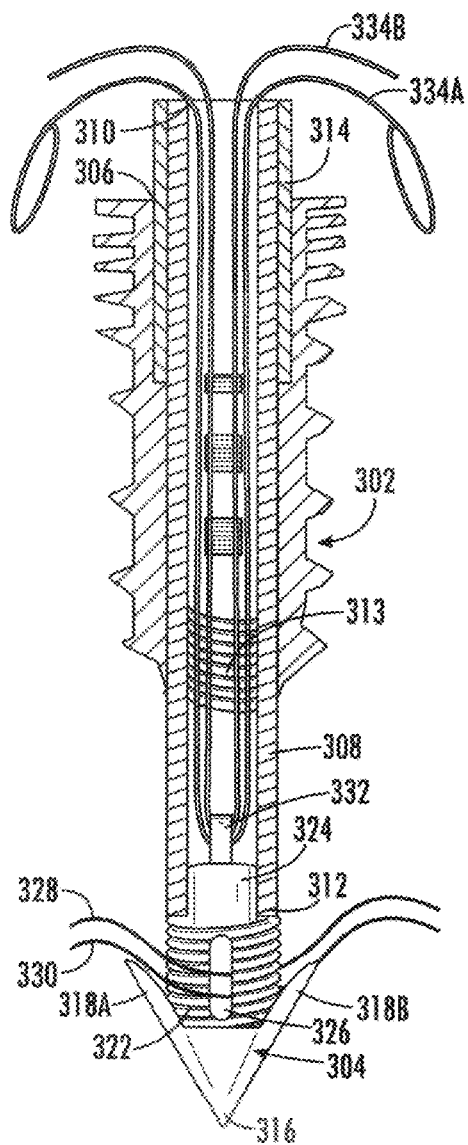
FIG. 17 is an internal view of the lateral row suture anchor of FIG. 15 in the pre-deployed configuration, with the handle of the hex driver removed for purposes of illustration.
Figure 18:
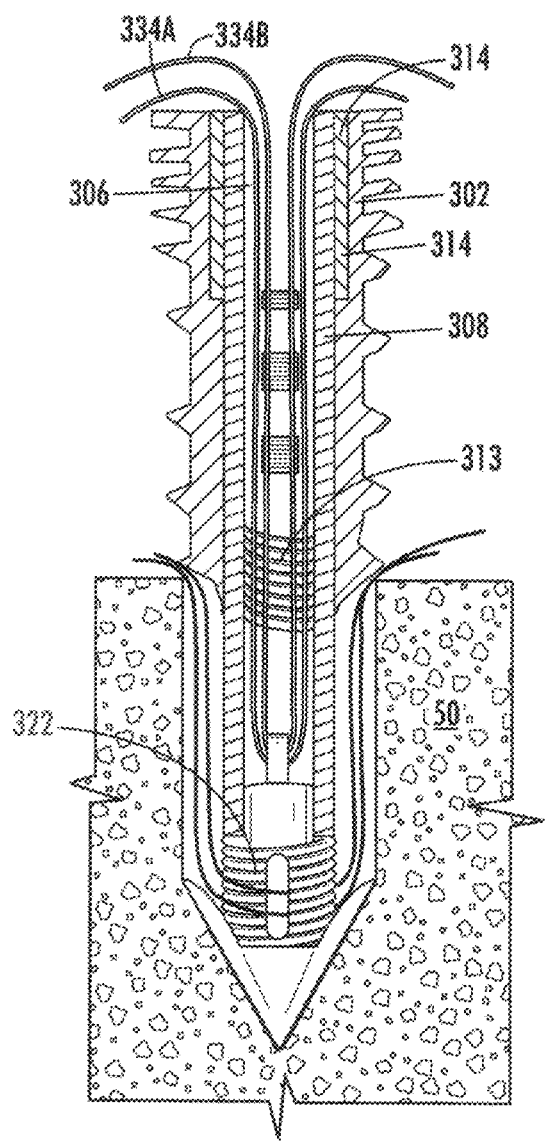
FIG. 18 is an internal view similar to FIG. 17, showing the lateral row suture anchor in a partially deployed configuration.

The distal tip 304 includes a pointed distal end 316 to facilitate insertion into bone, and a pair of proximal spikes 318 A, B which extend radially outwardly and proximally from the pointed distal end 316 to reduce the likelihood the likelihood of anchor pull-out. A proximally extending neck 320 is located radially inwardly of the spikes 318A, B. A distal portion 322 of the neck 320 is externally threaded, and a narrower proximal portion 324 extends into the open distal end 312 of the cylinder driver 308. An eyelet 326 provided in the externally threaded distal portion 322 of the neck 320 receives the free ends of repair sutures 328, 330 from the medial row. An apertured tab 332 is provided at the proximal end of the neck 324 for receiving first and second stay sutures 334 A, B that extend through the concentric interiors of anchor body 302, cylinder driver 308, and hex driver 314. For purposes of illustration, the stay sutures 334A, B have been shown in FIG. 17 to extend freely out from the proximal end of the cylinder driver shaft 308, but in practice, they would be tied together on top of the ball-shaped proximal end 336 of ball end hex driver 314, as shown in FIG. 15, holding the distal tip 304 in place until implantation is complete.

After the repair sutures 328, 330 have been inserted through the eyelet 326 in the distal tip 304, the surgeon taps or pounds on the closed proximal end 310 of cylinder driver 308, causing the pointed distal end 316 of the distal tip to penetrate the bone. When the distal thread of the proximal anchor body 302 engages the bone 50, as shown in FIG. 8 the surgeon rotates the hex driver 314, screwing the proximal anchor body 302 deeper into the bone.

Figure 19:
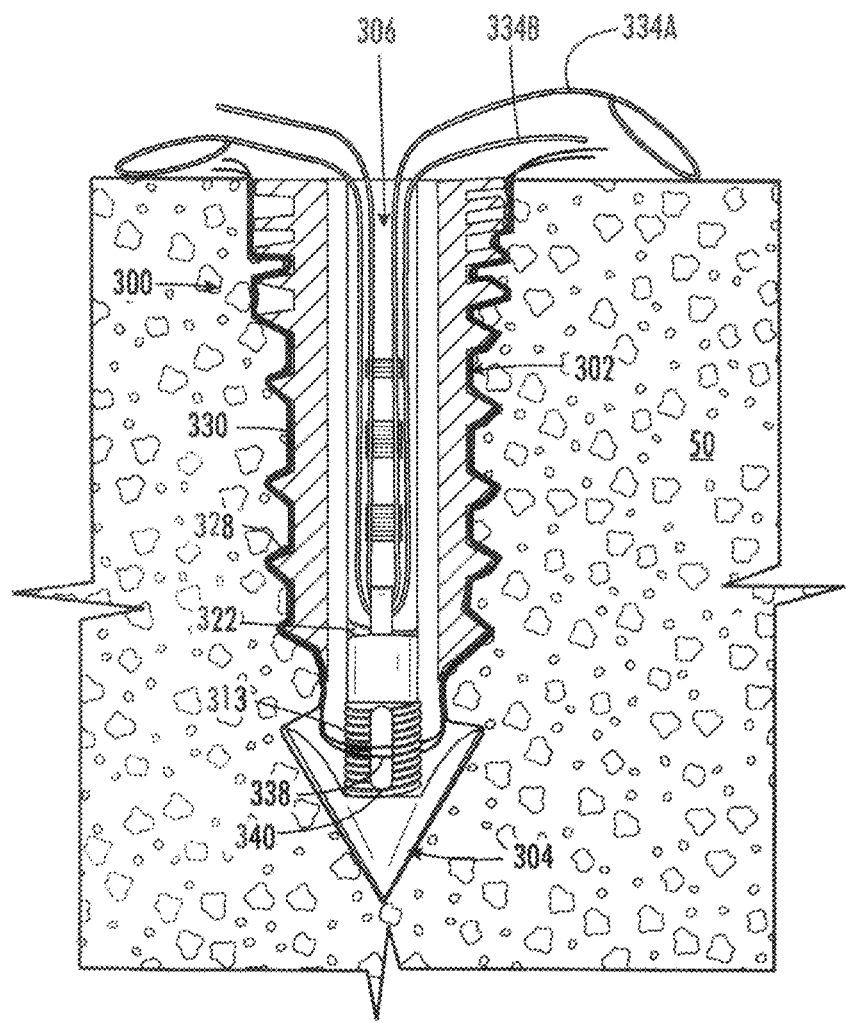
FIG. 19 is an internal view of lateral suture anchor of FIGS. 15-18 in a fully deployed configuration, after removal of the cylinder and hex drivers.

Continued rotation of the hex driver causes the internally threaded distal portion 313 of the inner cannulation 306 of the proximal anchor body 302 to reach and engage the externally threaded proximal portion 322 of the distal tip 304, locking the proximal anchor body 302 and the distal tip 304 together. At this point, the ends of the stay sutures 328, 330 are untied, and both the ball end hex driver and the cylinder driver are withdrawn from the anchor 300, as shown in FIG. 19. The repair sutures 328, 330 are now trapped between the bone 50 and the anchor 300, as well as between the distal end 338 of the proximal anchor body 302 and the distal end 340 of the eyelet 326 in the distal tip 304. The stay sutures 34A, B are available for use as needed to augment the strength of a repair after the lateral anchor 300 has been placed, and to prevent or reduce and stabilize dog-car lesions which might otherwise interfere with healing.

Figure 20:
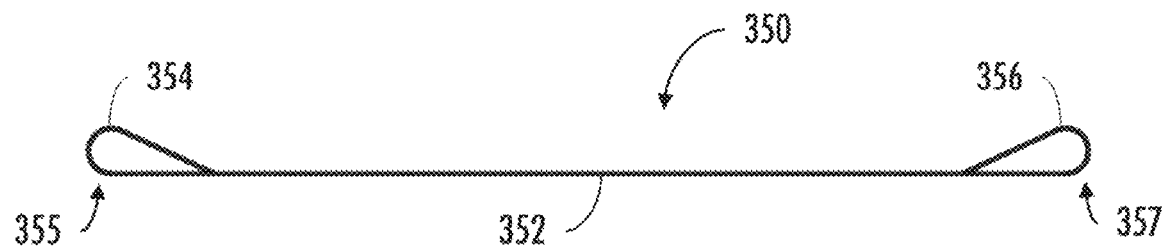
FIG. 20 shows a barbell suture.

FIG. 20 shows an alternate suture 350 which may be used in place of a continuous suture loop in any of the repair methods described above. The alternate suture 350, which will be referred to herein as a "barbell suture", includes a linear central segment 352 having a first loop 354 formed at one end and a second loop 3566 formed at the opposite end. The first loop 354 includes a first bight 355 and the second loop 356 includes a second bight 357. In this example, the entire suture is formed as a braided filament or wire.

Figure 21A:
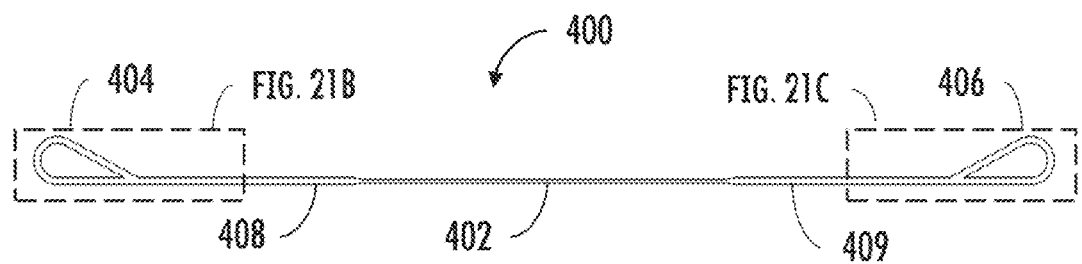
FIGS. 21A-C show an alternate barbell suture.
Figure 21B:
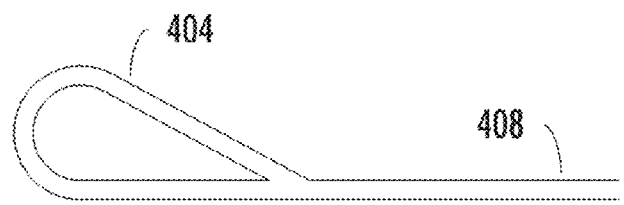
Figure 21C:
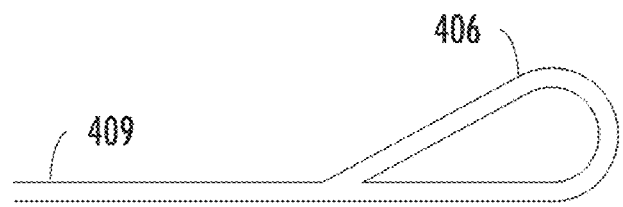

FIGS. 21A-C show a barbell suture 400 which is similar to the barbell suture shown in FIG. 20, except that, rather than being formed entirely of braided filament or wire, it has a hybrid structure; that is the loops 404, 406 are thicker than the central segment 402 and have the flat profile and dimensions of braided suture tape, while the central segment 402 has the round profile and dimensions of braided suture wire. Each of the loops 404, 406 is connected to the central segment 402 by a transition section 408, 409 also having the flat profile of suture tape. In another example, the entire suture including both loops and the central segment may be formed from a tape having a flat profile.

Figure 22A:
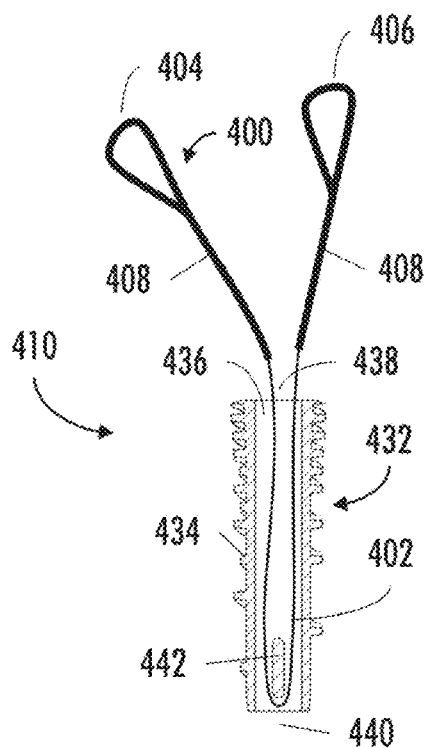
FIG. 22A shows a suture anchor assembly.

FIG. 22A shows an alternate suture assembly 410 including the hybrid barbell suture 400 of FIG. 21 and a suture anchor 432 including an anchor body 434 having an inner cannulation 436, an open proximal end 438, a distal end 440, and a suture engagement feature 442 disposed near the distal end 440. The barbell suture has been doubled on itself and positioned in the inner cannulation 436 of the suture anchor 432 such that the first loop 404 extends proximally out of one side of the open proximal end 438, the second loop extends proximally out of the opposite side of the open proximal end, and linear central portion 404 engages the suture engagement feature 442.

Figure 22B:
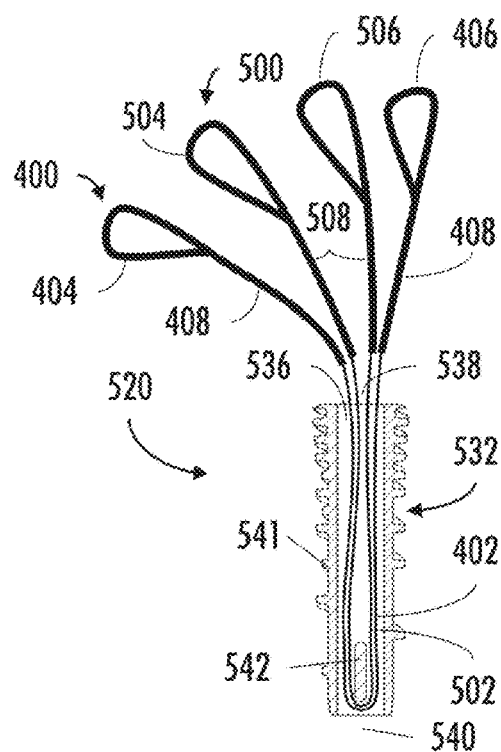
FIG. 22B shows an alternate suture anchor assembly.

FIG. 22B shows an alternate suture assembly 520 including two barbell sutures 400, 500 and a suture anchor 532 including an anchor body 541 having an inner cannulation 536, an open proximal end 538, a distal end 540, and a suture engagement feature 542 disposed near the distal end 540. Each barbell suture 400, 500 has been doubled on itself and positioned in the inner cannulation 536 of the suture anchor 532 such that the first loop 404, 504 extends proximally out of one side of the open proximal end 538, the second loop 406, 506 extends proximally out of the opposite side of the open proximal end 538, and linear central portion 404, 504 extends around and engages the suture engagement feature 542. This double-suture suture assembly 520 is useful for tissue attachment procedures requiring extra strength. For procedures requiring still more strength, triple-suture assemblies could also be created simply by adding a third barbell suture to the double-suture assembly 520.

Figure 22C:
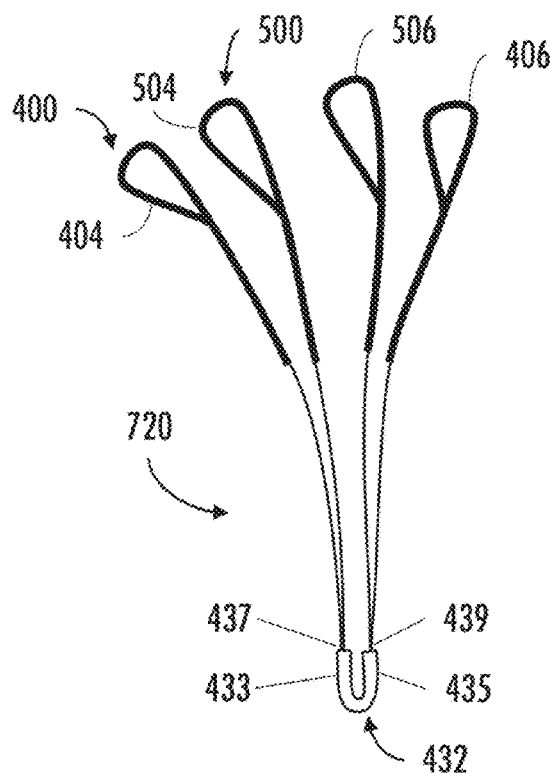
FIG. 22C shows another suture anchor assembly.

FIG. 22C shows a suture assembly 720 wherein the barbell sutures 400, 500 of FIG. 21B are disposed within an all-suture anchor 432 similar to that shown in FIG. 4B. The barbell sutures 400, 500 are woven through or otherwise embedded in the all-suture anchor 432 such that the first loop 404, 504 of each barbell suture extends through the first proximal opening 437 in the first side 433 of the suture anchor 432, and the second loop 406, 506 of each barbell suture extends through the second proximal opening 439 in the second side 435 of the suture anchor 432. When the all-suture anchor 432 is inserted in a pre-drilled hole in a bone and the loops are pulled, the anchor 432 collapses in the longitudinal direction and expands in the radial direction, exerting a contact force against the walls of the pre-drilled hole.

Figure 22D:
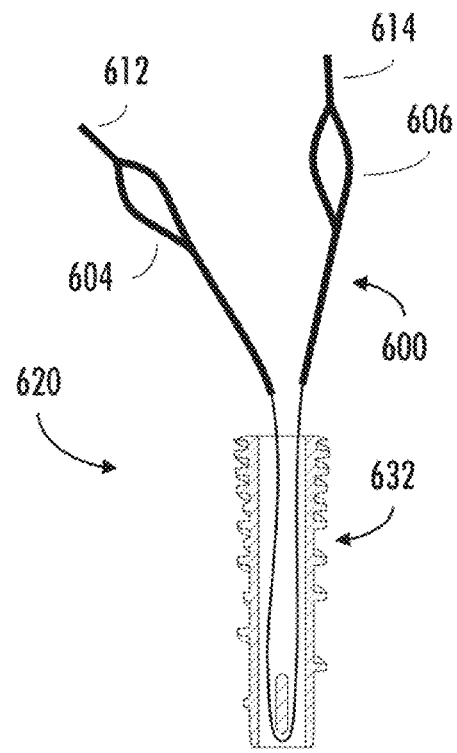
FIG. 22D shows still another suture anchor assembly.

FIG. 22D shows a suture assembly 620 including a suture anchor 632 and an alternate suture 600 which is similar to the barbell suture 400 of FIG. 20, with a first linear extension portion 612 extending outwardly from the first loop 604 and a second linear extension portion 614 extending outwardly from the second loop 606. The extension portions 612, may facilitate insertion of the loops into a suture passer or similar tool.

Figure 23A:
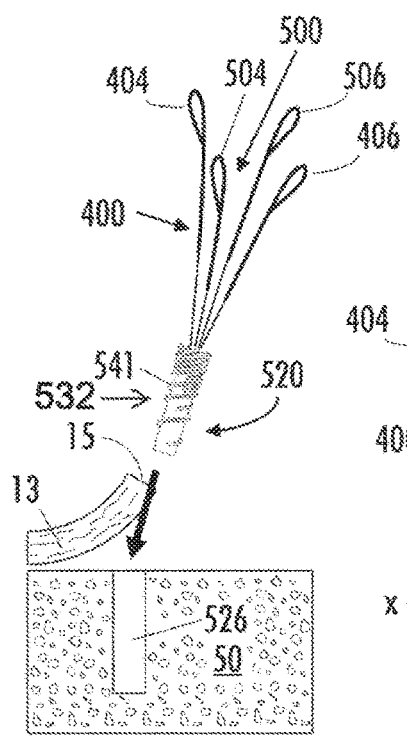
FIGS. 23A-G show a method of securing tissue to bone using the suture anchor assembly of FIG. 22B.
Figure 23B:
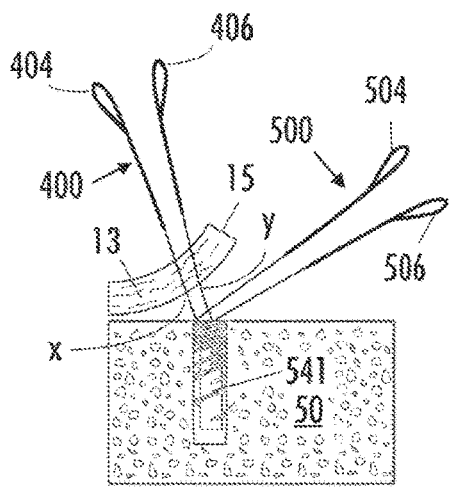
Figure 23C:
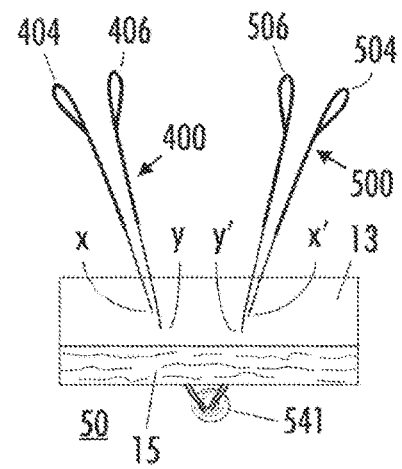
Figure 23D:
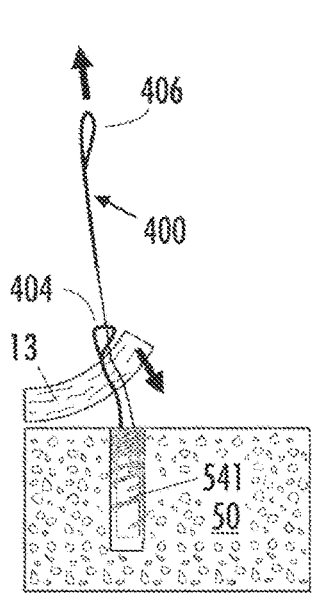
Figure 23E:
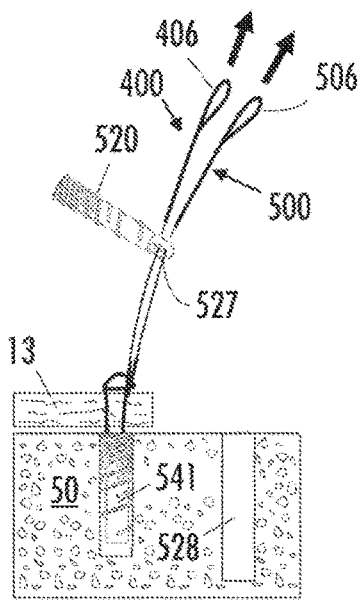
Figure 23F:
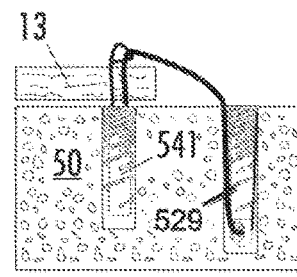
Figure 23G:
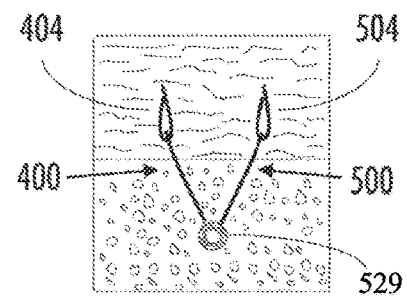

FIGS. 23A-G show a method of securing a flap of tissue 13 having an edge 15 to underlying hard tissue 50 using the suture assembly 520 of FIG. 22B. Initially, the anchor 532 of the suture assembly 520 is implanted in a bone hole 526 in the hard tissue 50, as shown in FIG. 22A. Then, the first loop 404 of the first barbell suture 400 is inserted through the tissue 13 at a first point x in the tissue flap 13 and the second loop 406 of the first barbell suture is inserted through the tissue at a second point y in the tissue, where points x and y are both located to one side of the suture anchor 541 and the second point y is located between the first point x and the edge 15 of the tissue flap 13, as shown in FIG. 23B. Next, the first loop and second loops 504, 506 of the second barbell suture 500 are inserted through third and fourth points $x^1$, $y^1$, where points $x^1$ and $y^1$ are located on opposite side of the anchor 541 from points x and y, and where point $y^1$ is located between point $x^1$ and the edge 15 of the tissue flap 13, as shown in FIG. 23C. The second loop 406 is then pulled through the first loop 404 of the first barbell suture 400, forming a luggage tag configuration, as shown in FIG. 23D, and the same procedure is repeated on the other side of the anchor 541 with loops 504, 506. The second loop of each suture 400, 500 is then inserted through an eyelet 527 in a lateral anchor 529, which is implanted in a lateral bone hole 528, as shown in FIGS. 23E-G.

Figure 24A:
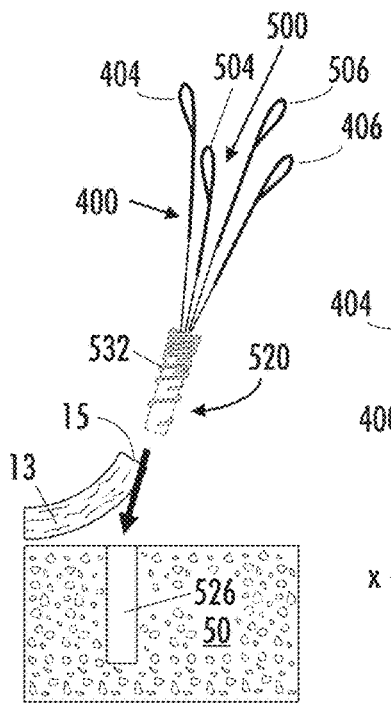
FIGS. 24A-G show an alternate method of securing tissue to bone using the suture anchor assembly of FIG. 22B.
Figure 24B:
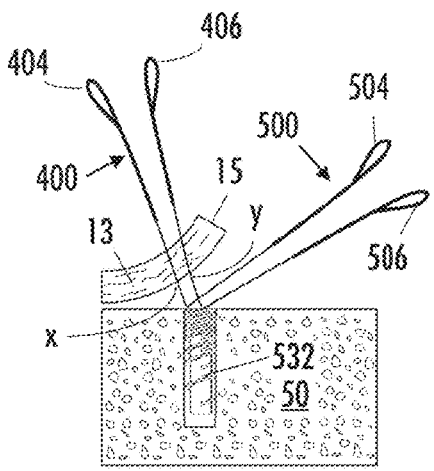
Figure 24C:
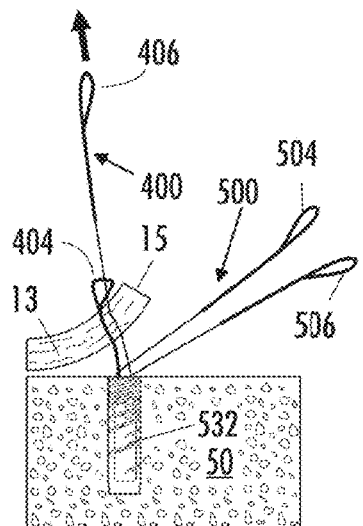
Figure 24D:
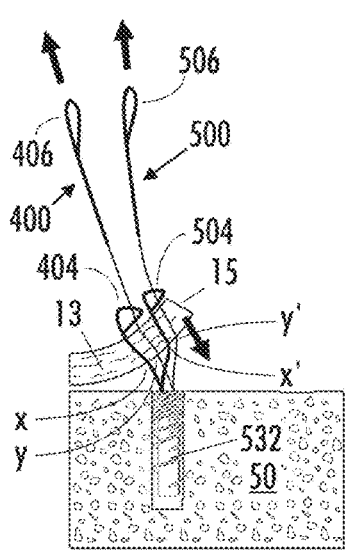
Figure 24E:
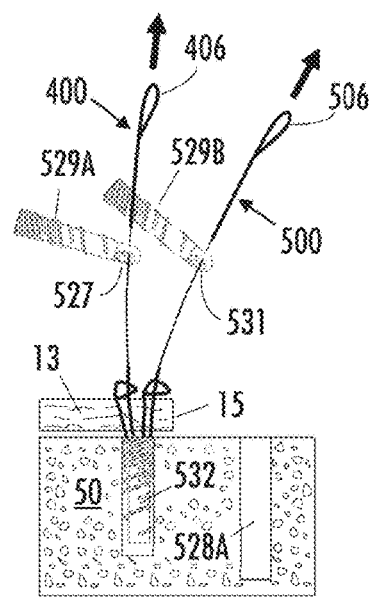
Figure 24F:
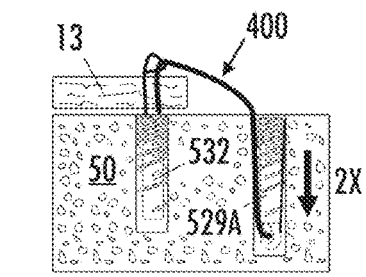
Figure 24G:
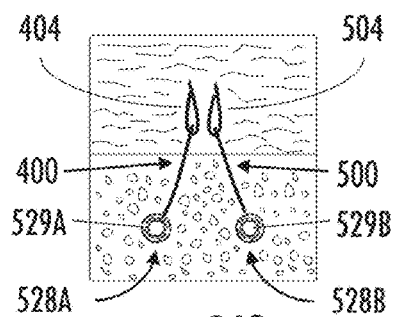

FIGS. 24A-G show an alternate method of securing a flap of tissue 13 to underlying hard 50 tissue using the suture assembly 520 of FIG. 22B. Initially, the anchor 532 of the suture assembly 520 is inserted into a bone hole 526 in the hard tissue 50, as shown in FIG. 24A. Then, the first loop 404 of the first barbell suture 400 is inserted through the tissue 13 at a first point x in the tissue flap 13 and the second loop 406 of the first barbell suture is inserted through the tissue at a second point y in the tissue, where points x and y are more or less directly over the suture anchor 532 and the second point y is located between the first point x and the edge 15 of the tissue flap 13, as shown in FIG. 24B. The second loop 406 of the first suture 400 is then passed through the first loop 404 of the first suture 400, forming a luggage tag configuration as in FIG. 24C. The procedure shown in FIGS. 24B and C is then repeated with the second suture 500, resulting in the configuration shown in FIG. 24D. The second loop 406 of the first suture 400 is then drawn through an eyelet 527 in a first lateral anchor 529A, which is implanted in a first lateral bone hole 528A, and the second loop 506 of the second suture 500 is drawn through an eyelet 531 in a second lateral anchor 529B which is implanted in a second lateral bone hole 528B, as shown in FIGS. 23 24E-G.

FIGS. 25A-G show another method of securing a flap of tissue 13 to underlying hard 50 tissue using two suture assemblies 520A, 520B similar to the suture assembly 520 of FIG. 22B. Initially, the anchor 532A of the suture assembly 520A is implanted in a bone hole 526A in the hard tissue 50, as shown in FIG. 25A. Then, the first loop 404 of the first barbell suture 400 is inserted through the tissue 13 at a first point x in the tissue flap 13 and the second loop 406 of the first barbell suture is inserted through the tissue at a second point y in the tissue, where points x and y are more or less directly over the suture anchor 532A and the second point y is located between the first point x and the edge 15 of the tissue flap 13, as shown in FIG. 25B. The anchor 532B of the second suture assembly 520B is then implanted in a second bone hole 526B and the the procedure of FIG. 25B is repeated with the loops 504, 506 of the second suture assembly 520A, resulting in the configuration shown in FIG. 25C. Next, the second loop 406 of the first barbell suture 400 is passed through the first loop 404 of the first barbell suture 400, forming a luggage tag configuration, as shown in FIG. 25D, and the same procedure is repeated with the second suture assembly 520B. The second loop of each suture 400, 500 is then inserted through an eyelet 527 in a lateral anchor 529, which is implanted in a lateral bone hole 528, as shown In FIGS. 25E-G.

FIGS. 26A-G show a method similar to the method of FIGS. 24A-G, using the suture assembly 720 of FIG. 22D instead of suture assembly 520 of FIG. 22B. Initially, the anchor 432 of the suture assembly 720 is inserted into a bone hole 526 in the hard tissue 50, as shown in FIG. 26A. Then, the first loop 404 of the first barbell suture 400 is inserted through the tissue 13 at a first point x in the tissue flap 13 and the second loop 406 of the first barbell suture is inserted through the tissue at a second point y in the tissue, where points x and y are more or less directly over the suture anchor 432 and the second point y is located between the first point x and the edge 15 of the tissue flap 13, as shown in FIG. 26B. The second loop 406 of the first suture 400 is then pulled through the first loop 400 of the first suture 400, forming a luggage tag configuration as in FIG. 26C. The procedure shown in FIGS. 26B and C is then repeated with the second suture loop 500, resulting in the configuration shown in FIG. 26D. The second loop 406 of the first suture 400 is then drawn through an eyelet 527 in a first lateral anchor 529A, which is implanted in a first lateral bone hole 528A, and the second loop 506 of the second suture 500 is drawn through an eyelet 531 in a second lateral anchor 529B which is implanted in a second lateral bone hole 528B, as shown in FIGS. 26E-G.

Figure 27A:
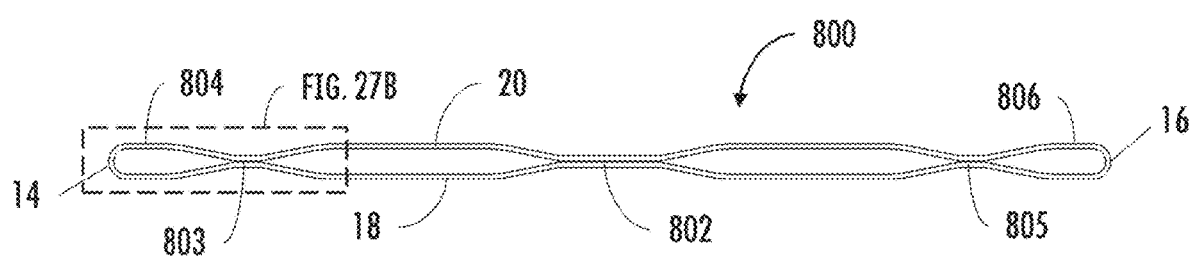
FIG. 27A shows a variation of the suture of FIG. 20.
Figure 27B:
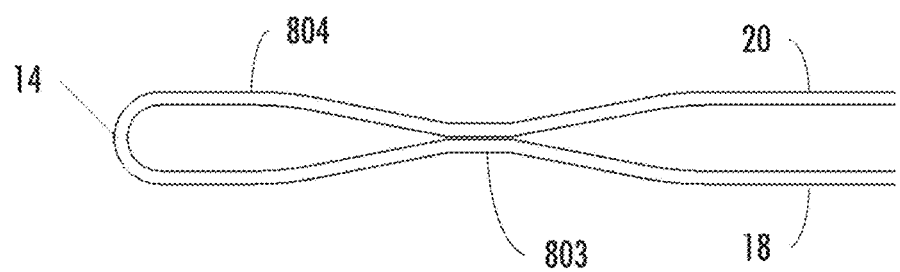
FIG. 27B is an enlarged view of Detail A of FIG. 26B.

FIGS. 27A and B show a barbell suture 800 similar to the barbell suture 400 of FIG. 20 but formed by flattening the two sides 18, 20 of the continuous loop suture 20 of FIG. 1 against one another to create a linear central segment 802. The sides 18, 20 are glued, braided, spliced, fused, or otherwise secured to one another at a first adhesion area 803 near the first end bight 14 and a second adhesion area 805 near the second end bight 16. The portion of the suture 800 between the first adhesion area 803 and the first end bight 14 defines a first loop 804, and the portion between the second adhesion area 805 and the second end bight 16 defines a second loop 806. If necessary, additional adhesion areas may be provided between sides 18 and 20, but for the most, the sides 803 should be free and independent of one another so they can be pulled apart as will be shown in the following method.

Variations of the barbell suture shown in FIGS. 27A and B can also be formed using the suture tape loop 120 of FIG. 2 or the hybrid suture loop 220 of FIG. 3A.

Figure 28A:
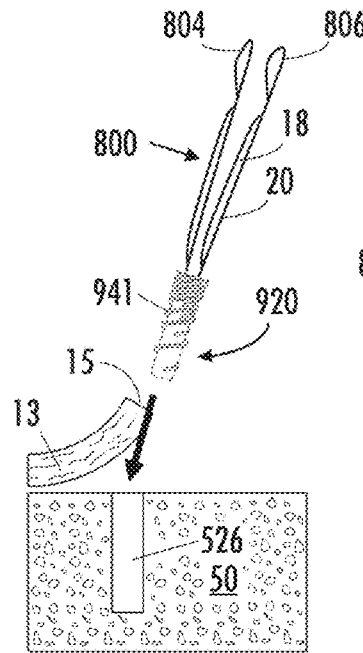
FIGS. 28A-G show a method of securing soft tissue to hard tissue using the suture of FIGS. 27A and B.
Figure 28B:
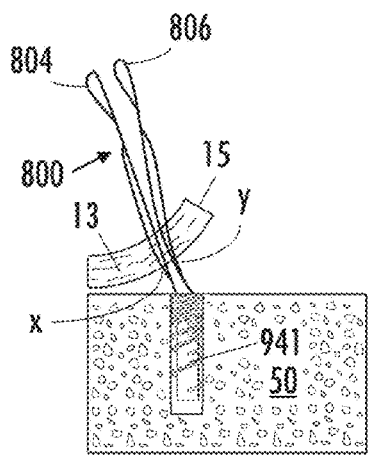
Figure 28C:
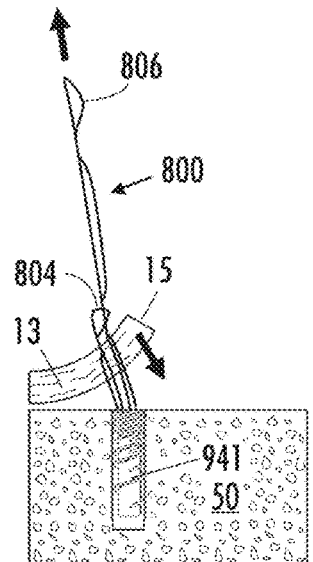
Figure 28D:
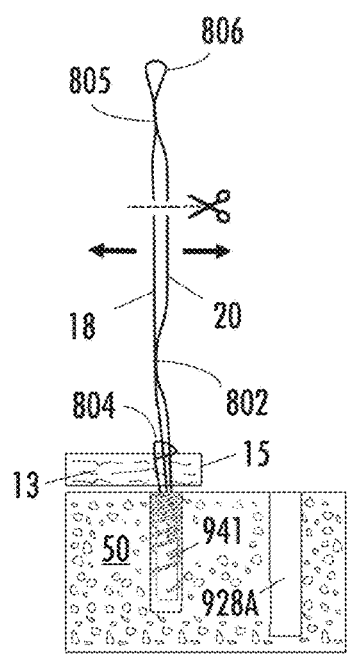
Figure 28E:
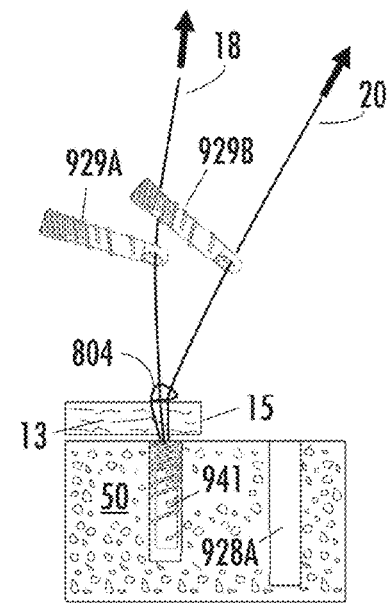
Figure 28F:
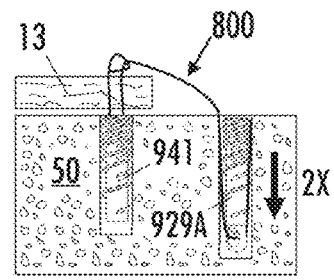
Figure 28G:
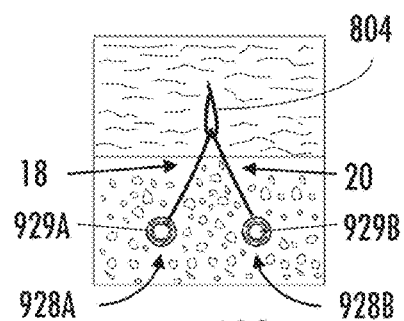

FIGS. 28A-G show a method similar to the method of FIGS. 24A-G using an alternate suture assembly 920 including a single barbell suture 800 rather than the two barbell sutures 400, 500 of the earlier method. Initially, the anchor 941 of the suture assembly is inserted into a bone hole 526 in the hard tissue 50, as shown in FIG. 28A. Then, the first loop 904 of the barbell suture 200 is inserted through the tissue 13 at a first point x in the tissue flap 13 and the second loop 906 is inserted through the tissue at a second point y in the tissue, where points x and y are more or less directly over the suture anchor 941 and the second point y is located between the first point x and the edge 15 of the tissue flap 13, as shown in FIG. 28B. The second loop 906 is then passed through the first loop 904 of the first suture 400, forming a luggage tag configuration as in FIG. 28C. The suture 900 is then cut at some point distal to the first adhesion area 903, as shown in FIG. 28D, which allows the two strands 18, 20 of the linear central portion 902 of the suture 900 to be separated and each one inserted through the distal tip of one of the lateral anchor 929A, B, as shown in FIG. 28E. The first lateral anchor 929A is then implanted in a first lateral bone hole 928A, and the second lateral anchor 929B is implanted in a second lateral bone hole 928B, as shown in FIGS. 28F and G.

FIG. 29 is a longitudinal cross-sectional view of a suture anchor 950 that may be used in place of suture anchor 532 in the suture assembly 520 of FIG. 22B and related methods. The suture anchor 950 includes an anchor body 952 having an inner cannulation 954, an open proximal end 956, a distal end 958, and a suture engagement feature 960 disposed above the distal end 958. In one example, shown in FIG. 30A. the suture engagement feature 960A comprises a circular member 962 that extends transversely across the inner cannulation 954. The circular member includes set of four openings 964 A, B, C, D, each of which is large enough to allow the thin portions of a hybrid barbell suture like that shown in FIG. 21A to easily pass through, but small enough to create a close fit between the thickest portions of the suture and the sides of the openings. In another example, shown in FIG. 30B, the suture engagement feature 960B comprises a pair of intersecting cross bars 966, 968 that extend transversely across inner cannulation 954. The spaces between adjacent sections of the cross bars 966, 968 define openings 970 A, B, C, D, each of which is large enough to allow the thin portions of a hybrid barbell suture like that shown in FIG. 21A to easily pass through, but small enough to create a close fit between the thickest portions of the suture and the sides of the openings. The close fit between the sutures and the surrounding sides of the openings in the suture engagement features of FIGS. 30A and B reduces the likelihood of suture slippage within the anchor.

Figure 31:
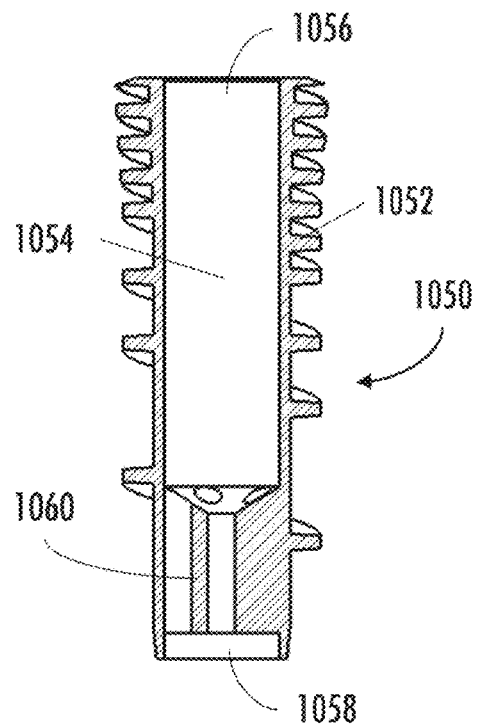
FIG. 31 is an alternate suture anchor.
Figures 32A, 32B:
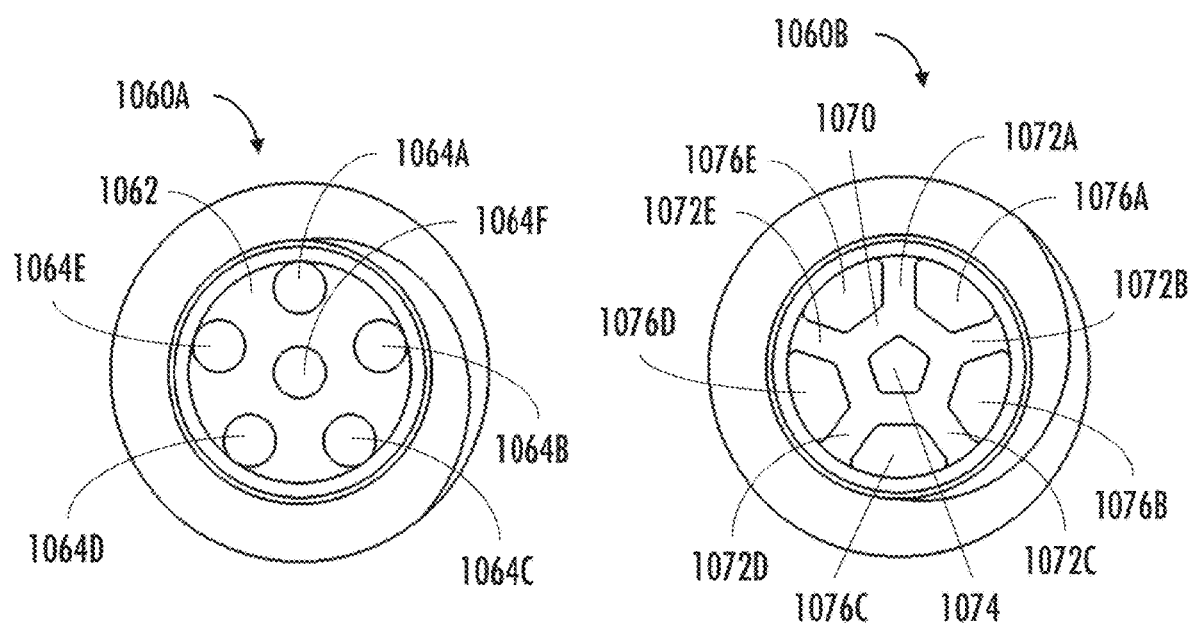
FIG. 32A is a bottom view of FIG. 31.
FIG. 32B is an alternate bottom view of FIG. 31.

FIG. 31 is a longitudinal cross-sectional view of a suture anchor 1050 that is similar to the suture anchor 950 of FIG. 29, but designed to be triple-loaded rather than double-loaded. The suture anchor 1050 includes an anchor body 1052 having an inner cannulation 1054, an open proximal end 1056, a distal end 1058, and a suture engagement feature 1060 disposed above the distal end 1058. In one example, shown in FIG. 31A, the suture engagement feature 1060A comprises a circular member 1062 that extends transversely across the inner cannulation 1054. The circular member includes set of six openings 964 A, B, C, D, E, F, each of which is large enough to allow the thin portions of a hybrid barbell suture like that shown in FIG. 21A to easily pass through, but small enough to create a close fit between the thickest portions of the suture and the sides of the openings. In another example, shown in FIG. 31B, the suture engagement feature 1060B comprises a hexagonal element 1070 having an arm 1072 A, B, C, D, E extending radially outwardly from each of its corners and a hexagonal opening 1074 formed in its center. The spaces between adjacent arms 1072 A, B, C, D, E define openings 1076 A, B, C, D, E. Each of these openings 1076 A, B, C, D, E and the central opening 1074 is large enough to allow the thin portions of a hybrid barbell suture like that shown in FIG. 21A to easily pass through, but small enough to create a close fit between the thickest portions of the suture and the sides of the openings. The close fit between the sutures and the surrounding sides of the openings in the suture engagement features of FIGS. 31 A and B reduces the likelihood of suture slippage within the anchor.

Figure 33:
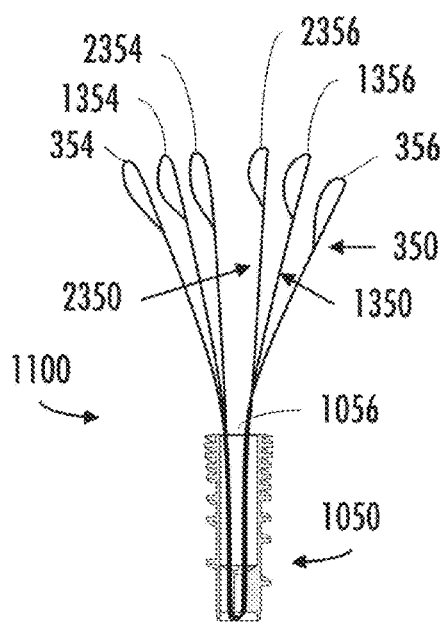
FIG. 33 is a suture anchor assembly.
Figure 34:
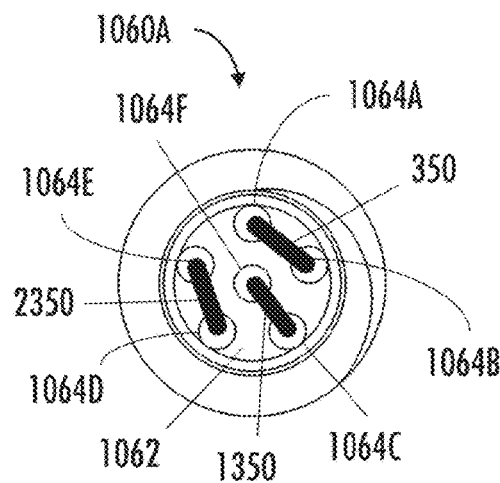
FIG. 34 is a bottom view of the suture anchor assembly of FIG. 33.

FIGS. 33 and 34 show a triple-loaded suture assembly 1100 including the suture anchor 1050 of FIG. 31 and three barbell sutures. A first barbell suture 350 of the type shown in FIG. 20 has been threaded through the suture engagement feature 1060A such that the first loop 354 extends proximally out one side of the open proximal end 1056, the second loop 356 extends proximally out of the opposite side of the open proximal end 1056, and the central portion extends through adjacent openings 1064A, B in the circular member 1062. A second barbell suture 1350 has been similarly positioned, with its first and second loops 1354, 1356 extending proximally out of opposite sides of the open proximal end 1056 and its central portion extending through adjacent openings 1064 C, F in the circular member 1062. A third barbell suture 2350 has also been positioned similarly, with its first and second loops 1354, 1356 extending proximally out of opposite sides of the open proximal end 1056 and its central portion extending through adjacent openings 1064 D, E in the circular member 1062.

Figure 35A:
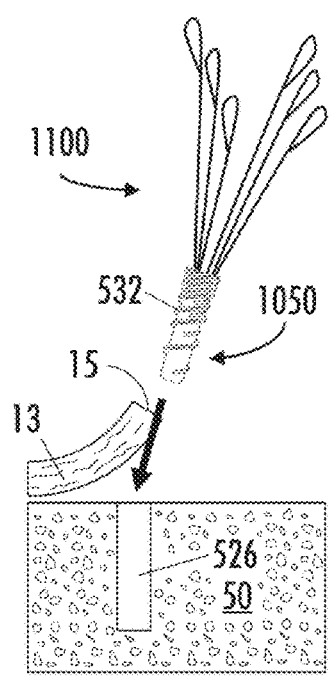
FIGS. 35A-G show a method of securing soft tissue to hard tissue using the suture assembly of FIGS. 33 and 34.
Figure 35B:
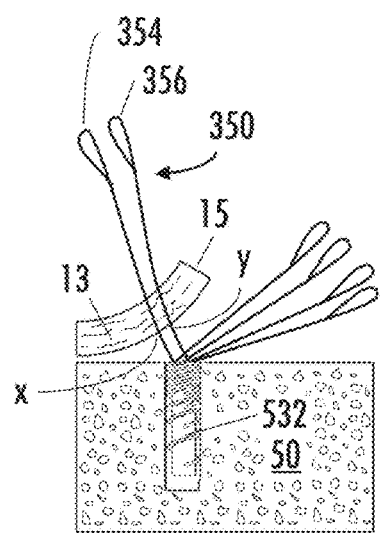
Figure 35C:
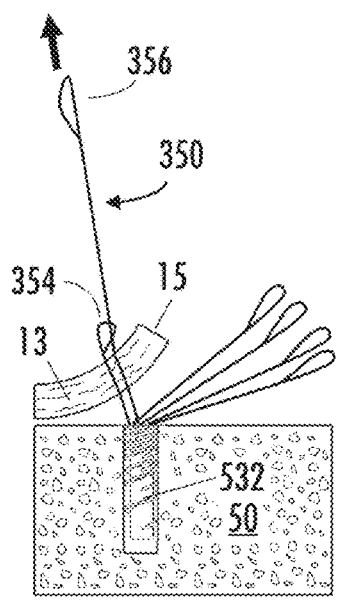
Figure 35D:
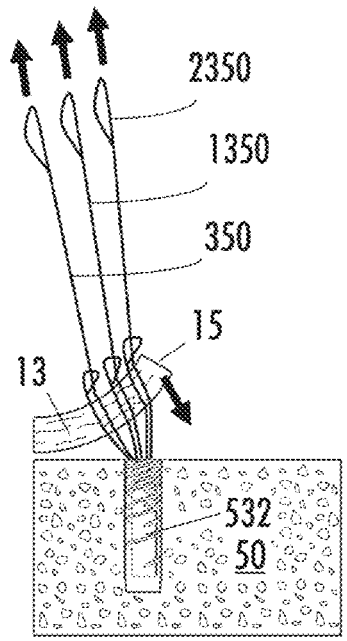
Figure 35E:
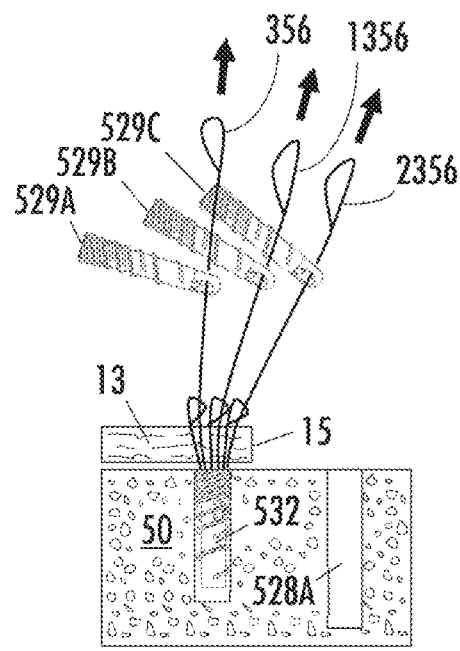
Figure 35F:
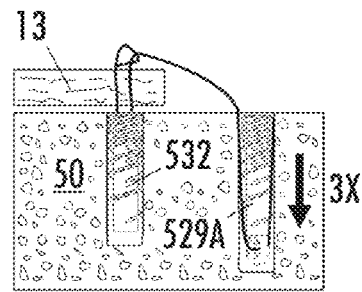
Figure 35G:
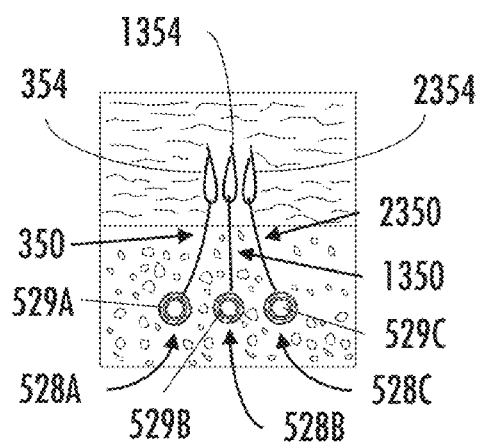

FIGS. 35A-G show a method of securing a flap of tissue 13 having an edge 15 to underlying hard tissue 50 using the suture assembly 1100 of FIG. 33. Initially, the anchor 532 of the suture assembly 1050 is implanted in a bone hole 526 in the hard tissue 50, as shown in FIG. 35A. Then, the first loop 354 of the first barbell suture 350 is inserted through the tissue 13 at a first point x in the tissue flap 13 and the second loop 3566 of the first barbell suture 350 is inserted through the tissue at a second point y in the tissue, where points x and y are more or less directly over the suture anchor 532 and the second point y is located between the first point x and the edge 15 of the tissue flap 13, as shown in FIG. 35B. The second loop 356 of the first barbell suture 350 is then passed through the first loop 354 of the first suture 3500, forming a luggage tag configuration as in FIG. 35C. The procedure shown in FIGS. 33B and C is then repeated with the second and third sutures 1350, 2350, resulting in the configuration shown in FIG. 35D. The second loop 356, 1356, 2356 of each suture 350, 1350, 2350 is then drawn through an eyelet in one of three lateral anchors 529 A, B, C, each of which is implanted in one of three lateral bone holes 528 A, B, C, as shown in FIGS. 35 E-G.

Figure 36:
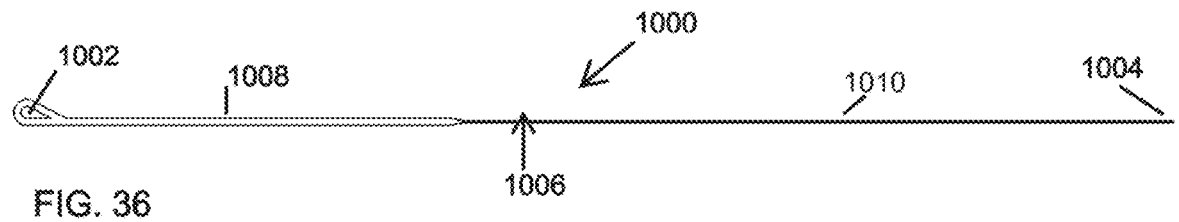
FIG. 36 shows a loop-and-tail suture.

FIG. 36 shows an alternate suture 1000 which can be used in place of either a continuous suture loop or a barbell suture in any of the repair methods described above. The alternate suture 1000, which will be referred to herein as a "loop-and-tail suture," includes a loop 1002 defining an opening at its first end, a straight linear second end 1004, and an intermediate section 1006 joining the first and second ends 1002, 1004. As shown here, the suture 1000 has a hybrid structure. That is, the loop 1002 and the portion 1008 of the intermediate section nearest the loop have the flat profile and dimensions of braided suture tape, while the second end 1004 and the portion 1010 of the intermediate section nearest the second end 1004 have the round profile and dimensions of braided suture wire. Ideally, the thickness of the thick portion 1008 of the intermediate section should be nearly equal to the size of the opening in the loop 1002 so that the tail locks in place when a luggage tag is formed. However, in some cases the suture 1000 could be formed entirely of suture tape or entirely of suture wire, depending on the preferences of individual surgeons.

Figures 37A, 37B:
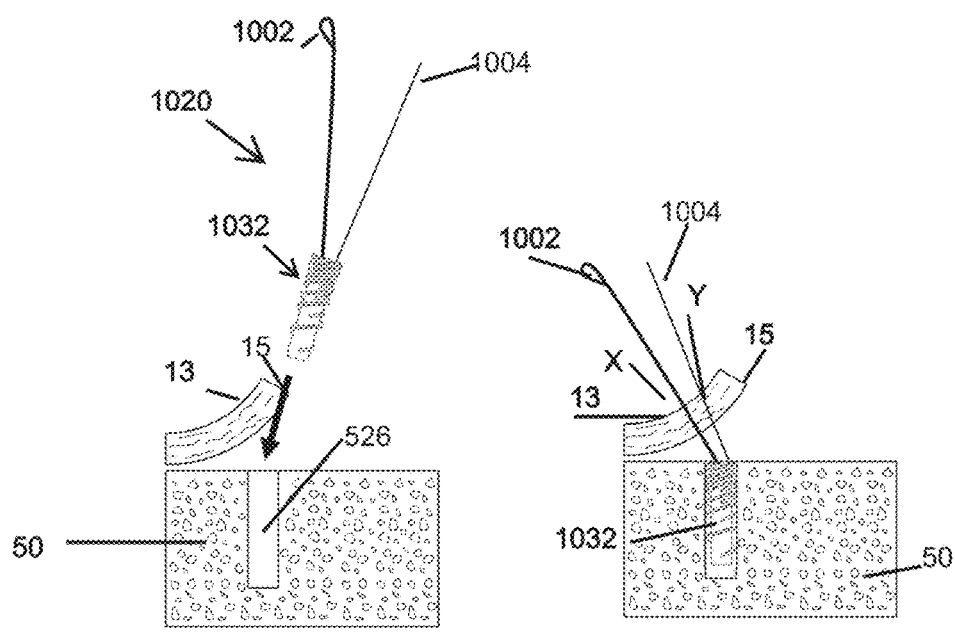
FIGS. 37A-E show a method of securing soft tissue to hard tissue using the loop-and-tail suture of FIG. 36.
Figure 37C:
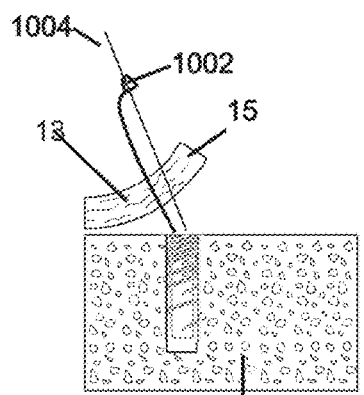
Figure 37D:
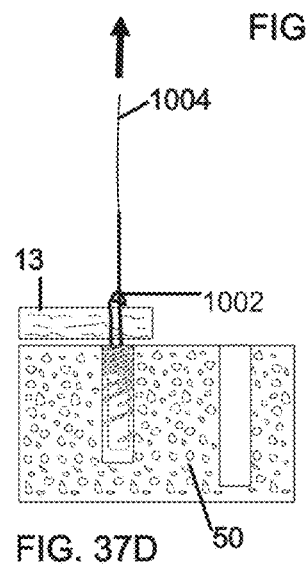
Figure 37E:
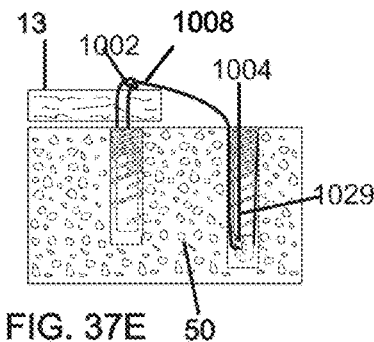

FIGS. 37A-E show a method of securing a flap of tissue 13 having an edge 15 to underlying hard tissue 50 using a suture assembly 1020 comprising the loop-and-tail suture 1000 of FIG. 36 disposed within a medial suture anchor 1032. Initially, the anchor 1032 is implanted in a bone hole 526 in the hard tissue, as shown in FIG. 37A. Then the loop 1002 is inserted through the tissue 13 at a first point x in the tissue flap 13 and the straight linear second end 1004 is inserted through the tissue at a second point y in the tissue, where points x and y are both located to one side of the suture anchor 1032 and the second point y is located between the first point x and the edge 15 of the tissue flap 13, as shown in FIG. 37B. Next, the straight linear second end 1004 is pulled through the opening of the loop 1002, forming a luggage tag configuration as in FIG. 37C. The second end 1004 is then pulled until the loop 1002 is compressed against the tissue flap 13, as shown in FIG. 37D. Finally, the second end 1004 is inserted into a lateral row anchor 1029, which is then implanted into a lateral bone hole 528, securing the luggage tag in place against the tissue 13, as shown in FIG. 37E. In this version of the method, the tight fit between the thick section 1008 of the suture and the opening of the loop 1002 acts as a secondary lock preventing slippage of the suture.

FIG. 38 shows an alternative configuration in which the loop-and-tail suture 1000 of FIG. 36 is provided with a tubular sleeve 1012 which can be slid over the straight linear second end 1004. In the illustrated hybrid version of this suture, the inner diameter of the tubular sleeve is sufficiently larger than the diameter of the linear second end 1004 to allow the sleeve 1012 to slide easily over the second end 1004 and the adjacent thin portion 1010 of the suture, but may be only slightly greater than the thick portion 1008 of the suture.

FIGS. 39A-F show a method of securing a flap of tissue 13 to underlying hard 50 tissue using the suture assembly 1020 shown in FIG. 38. This method is identical to the method shown in FIGS. 37A-E, except that after the, the straight linear second end 1004 is pulled through the opening of the loop 1002 to form the luggage tag configuration as shown in FIG. 39D, the sleeve 1012 is slid over the straight linear second end 1004 of the suture 1000 until it contacts the loop 1002, as shown in FIG. 39E. The second end 1004 is inserted into a lateral row anchor 1029, which is then implanted into a lateral bone hole 528, securing the luggage tag in place against the tissue 13, as shown in FIG. 39F. In this method, the likelihood of suture slippage is extremely small, since the suture is locked into place in two locations. The straight linear second end 1004 of the suture is trapped in an interference fit between the bone 50 and the lateral anchor 1029, while the loop 102 is held in place against the tissue 13 by the sleeve 1012.

Figure 40:
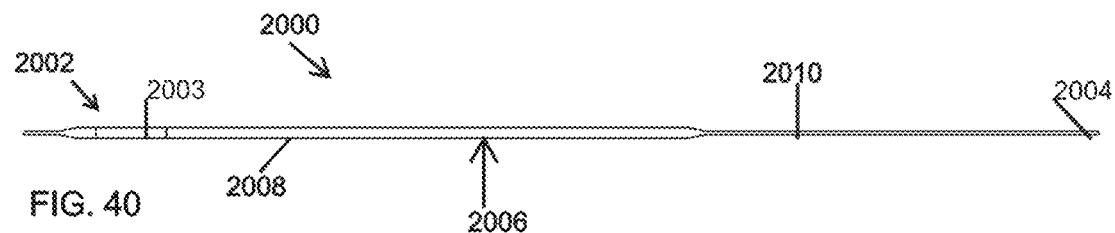
FIG. 40 shows an alternate suture having an integral sleeve.

FIG. 40 shows another alternate suture 2000 having an integral locking sleeve 2003 at its first end 2002, a straight linear second end 2004, and an intermediate section 2006 joining the first and second ends 2002, 2004. As shown here, the suture 2000 has a hybrid structure. That is, the loop 2002 and the portion 2008 of the intermediate section nearest the loop have the flat profile and dimensions of braided suture tape, while the second end 2004 and the portion 2010 of the intermediate section nearest the second end 2004 have the round profile and dimensions of braided suture wire. However, the suture 2000 could also be formed entirely of suture tape or entirely of suture wire.

Figures 41, 42A, 42B:
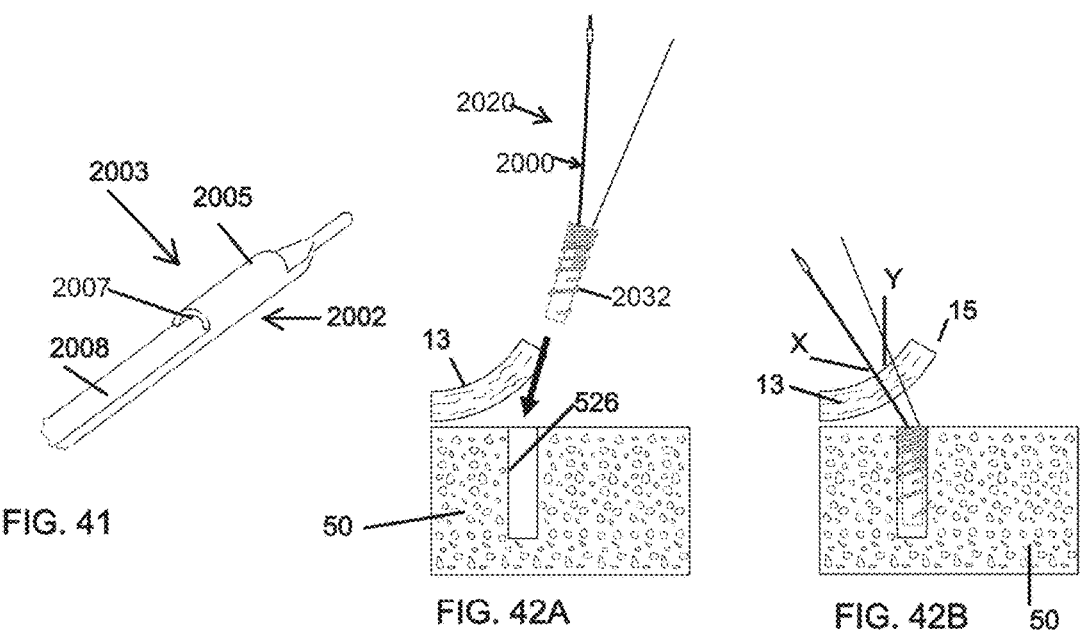
FIG. 41 is an enlarged view of the integral sleeve of FIG. 40.
FIGS. 42A-E show a method of securing soft tissue to hard tissue using the suture of FIG. 40.

As shown in FIG. 41, the locking sleeve 2003 comprises an elongated archway 2005 extending over the first end 2002 of the suture, forming a tunnel or passageway 2007. In the illustrated hybrid version of this suture, the inner diameter of the tubular sleeve is sufficiently larger than the diameter of the linear second end 2004 to allow the second end 2004 to pass through, but may be only slightly greater than the thick portion 2008 of the suture.

Figures 42C, 42D, 42E:
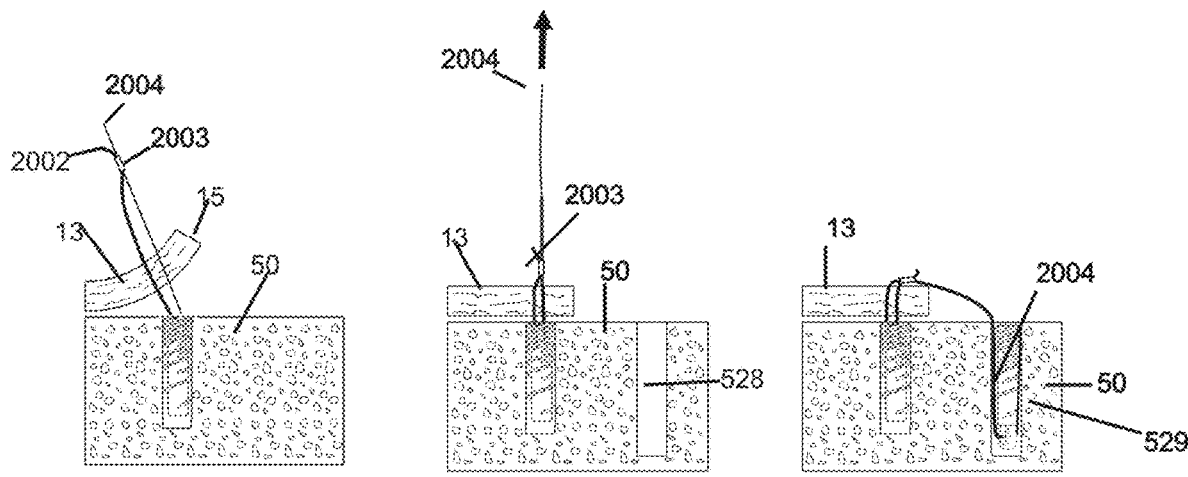

FIGS. 42A-F show a method of securing a flap of tissue 13 having an edge 15 to underlying hard tissue 50 using a suture assembly 2020 comprising the suture 2000 of FIG. 40 disposed within a medial suture anchor 2032. Initially, the anchor 2032 is implanted in a bone hole 526 in the hard tissue 50, as shown in FIG. 42A. Then the first end 2002 of the suture 2000 is inserted through the tissue 13 at a first point x in the tissue flap 13 and the straight linear second end 2004 is inserted through the tissue at a second point y in the tissue, where points x and y are both located to one side of the suture anchor 2032 and the second point y is located between the first point x and the edge 15 of the tissue flap 13, as shown in FIG. 42B. Next, the straight linear second end 2004 is pulled through the passageway of the locking sleeve 2003, forming a luggage tag configuration as in FIG. 42C. The second end 2004 is then pulled until the locking sleeve 2002 is compressed against the tissue flap 13, as shown in FIG. 37D. Finally, the second end 2004 is inserted into a lateral row anchor 2029, which is then implanted into a lateral bone hole 528, securing the luggage tag in place against the tissue 13, as shown in FIG. 42E. Here, as in the previous method, the likelihood of suture slippage is extremely small, since the suture is actually locked into place in two locations. The straight linear second end 2004 of the suture is trapped in an interference fit between the bone 50 and the lateral anchor 2029, while the first end 2002 is held in place against the tissue 13 by the locking sleeve 1012.

FIG. 43A shows yet another alternate suture 3000 having a hybrid structure. Except for a short tip portion 3001 which has characteristics of a braided suture wire, the first end 3002 of the suture 3000 has the flat profile and dimensions of braided suture tape, while the second end 3004 has the round profile and dimensions of braided suture wire. A small opening 3005 is formed in the flat portion of the first end 3002, as best seen in FIG. 43B. The dimensions of the opening 3005 are selected to allow the second end 3004 to pass through.

FIGS. 44A-F show a method of securing a flap of tissue 13 having an edge 15 to underlying hard tissue 50 using a suture assembly 3020 comprising the suture 3000 of FIG. 43A disposed within a medial suture anchor 3032. Initially, the anchor 3032 is implanted in a bone hole 526 in the hard tissue 50, as shown in FIG. 44A. Then the first end 3002 of the suture 3000 is inserted through the tissue 13 at a first point x in the tissue flap 13 and the straight linear second end 3004 is inserted through the tissue at a second point y in the tissue, where points x and y are both located to one side of the suture anchor 3032 and the second point y is located between the first point x and the edge 15 of the tissue flap 13, as shown in FIG. 44B. Next, the straight linear second end 3004 is pulled through the opening 3005 in the first end 3002, forming a luggage tag configuration as in FIG. 44C. The second end 3004 is then pulled until the first end 3002 is compressed against the tissue flap 13, as shown in FIG. 44D. Finally, the second end 3004 is inserted into a lateral row anchor 3029, which is then implanted into a lateral bone hole 528, securing the luggage tag in place against the tissue 13, as shown in FIG. 44E.

Any of the sutures described above may be used in place of, or in combination with, any of the other sutures in the suture assemblies and/or methods described in this disclosure. For instance, either of the two barbell sutures 400, 500 in the two-barbell suture assembly shown in FIG. 22B could be replaced by a continuous loop suture as shown in FIGS. 1A-C, the loop-and-tail suture shown in FIG. 36, or any of the alternative sutures shown in FIG. 38, 40, or 43. Similarly, one or two of the barbell sutures in the three-barbell suture assembly shown in FIG. 33 could be replaced with one or two continuous loop sutures, one or two barbell sutures, one continuous loop suture and one barbell suture, or any combination of the alternative sutures shown in FIG. 38, 40, or 43. All that is required is that each of the sutures defines an opening that is capable of receiving the opposite end in order to create a luggage tag formation. Furthermore, each of the sutures may have the structure of suture tape, suture wire, or a hybrid structure, depending on the preferences of individual surgeons.

FIGS. 45A-G show a method of tissue repair that is essentially the same as the method shown in FIGS. 23A-G, except that the two-barbell suture assembly has been replaced by an alternative suture assembly 4000 including one barbell suture 4400 and one continuous loop suture 4500. The barbell suture 4400 includes a first loop 4404 at one end and a second loop 4406 at the other end. The continuous loop suture 4500 includes a first bight end bight 4514 and a second end bight 4516. Initially, the anchor 4541 of the suture assembly 4000 is implanted in a bone hole 526 in the hard tissue 50, as shown in FIG. 22A. Then, the first bight 4514 of the continuous loop suture 4500 is inserted through the tissue 13 at a first point x in the tissue flap 13 and the second bight 4516 of the continuous loop suture 4500 is inserted through the tissue 13 at a second point y in the tissue 13, where points x and y are both located to one side of the suture anchor 4541 and the second point y is located between the first point x and the edge 15 of the tissue flap 13, as shown in FIG. 45B. Next, the first loop and second loops 4404, 4406 of the barbell suture 4400 are inserted through third and fourth points $x^1$, $y^1$, where points $x^1$ and $y^1$ are located on opposite side of the anchor 4541 from points x and y, and where point $y^1$ is located between point $x^1$ and the edge of the tissue flap, as shown in FIG. 45C. The second bight 4516 of the continuous loop suture 4500 is then pulled through the first bight 4514 to form a first luggage tag configuration and the second loop 4406 of the barbell suture 4400 is pulled through the first loop 4404 to create a second luggage tag configuration, as shown in FIG. 45D. The second bight 4516 of the continuous loop suture and the second loop 4406 of the barbell suture are then inserted through an eyelet in a lateral anchor 4529, which is implanted in a lateral bone hole 528, as shown in FIGS. 45E-G.

FIGS. 46A-G show a method of securing a flap of tissue 13 to underlying hard tissue 50 using an alternate suture assembly 5000 comprising a first barbell suture 5400, a second barbell suture 5450, and a continuous loop suture 5500 disposed within a medial suture anchor 5532. Initially, the anchor 5532 is implanted in a bone hole 526 in the hard tissue 50, as shown in FIG. 35A. Then, the first bight 5514 of the continuous loop suture 5500 is inserted through the tissue 13 at a first point x in the tissue flap 13 and the second bight 5516 of the continuous loop suture is inserted through the tissue at a second point y in the tissue, where points x and y are more or less directly over the suture anchor 5532 and the second point y is located between the first point x and the edge 15 of the tissue flap 13, as shown in FIG. 46B. The first and second loops 5404, 5406 and 5454, 5456 of the first and second barbell sutures 5400, 5450 are then inserted through the tissue 13 at points x', y' and x", y" as shown in FIG. 46C. The second loop 5406 of the first barbell suture 5400 is then inserted through first loop 5405 of the first barbell suture 5400; the second bight 5516 of the continuous loop suture 550 is inserted through the first bight 5514 of the continuous loops suture 5500; and the second loop 5456 of the second barbell suture 5450 I inserted through the first loop 5454 of the second barbell suture 5450 to form three luggage tag configurations, as shown in FIG. 46D. Th second bight 5516 of the continuous loop is then cut, dividing it into two strands 5521 and 5523, the first of which 5521 is inserted through the distal end of a first lateral anchor 5529A along with the second loop 5416 of the first barbell suture, and the second of which 5523 is inserted through the distal end of a second lateral anchor 5529B along with the second loop 5446 of the second barbell suture, as shown in FIG. 46E. The two lateral anchors 5529A, B are then implanted in lateral bone holes 5528A, B, as shown in FIGS. 46F and G.

As an alternative to inserting the strands 5521, 5523 into the lateral anchors 5529*a*, B, the strands 5521, 5523 may be tied in a knot as shown in FIG. 6C, thus providing a secondary lock preventing the sutures from slipping relative to the tissue.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A suture comprising a closed loop of continuously braided suture material, the loop including:
    a first portion having a round profile and a predetermined diameter; and
    a second portion having a flat profile and a thickness which is greater than the predetermined diameter.
2. A suture assembly comprising the suture according to claim 1 disposed within a suture anchor.
3. The suture according to claim 1, wherein the suture is anchorless.

* * * * *